Oct. 26, 1965
A. S. VALK ETAL
3,213,632
SHIP FOR TRANSPORTING LIQUEFIED
GASES AND OTHER LIQUIDS
Original Filed March 7, 1960
16 Sheets-Sheet 1
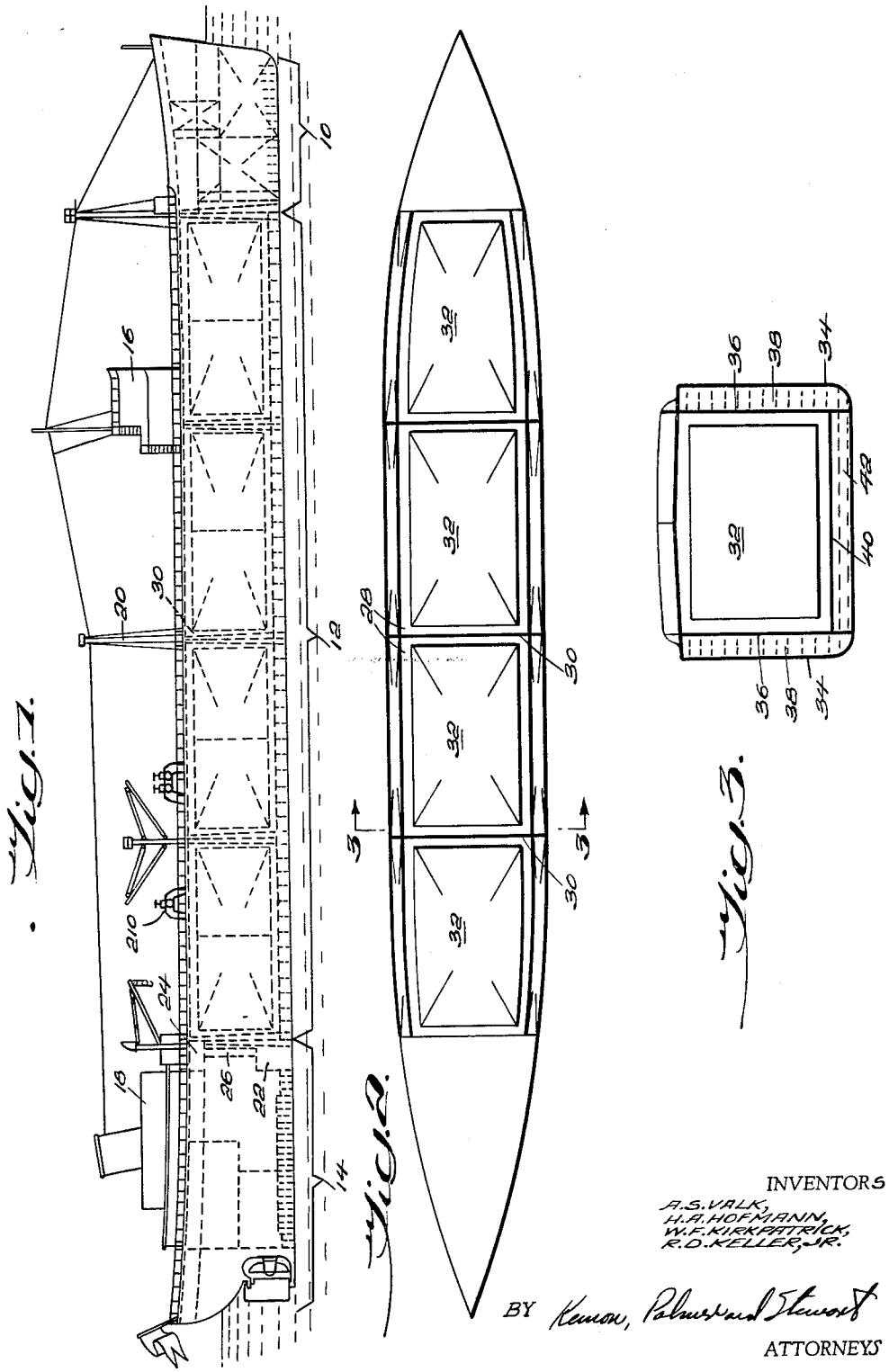
INVENTORS
A.S. VALK,
H.A. HOFMANN,
W.F. KIRKPATRICK,
R.D. KELLER, JR.
BY Kenyon, Palmer and Stewart
ATTORNEYS

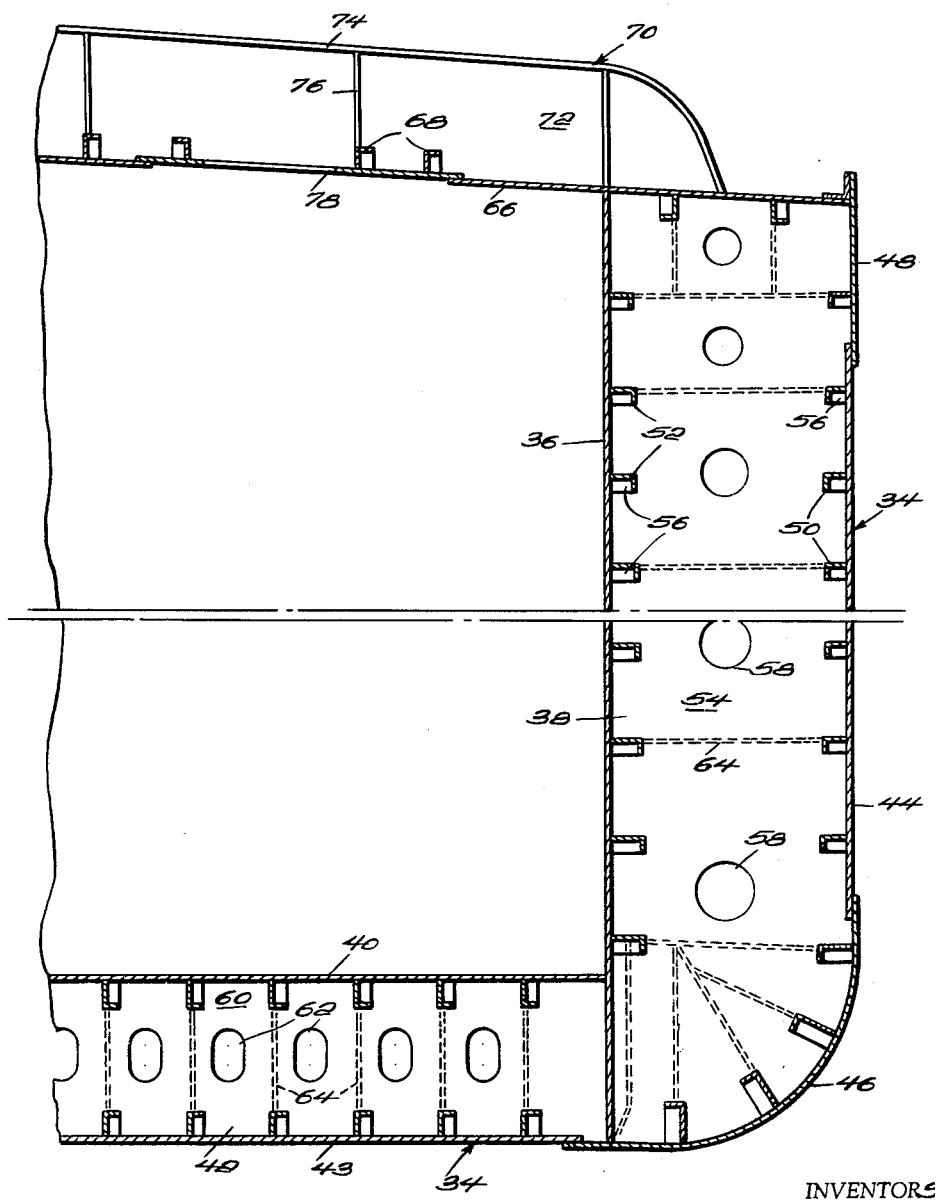

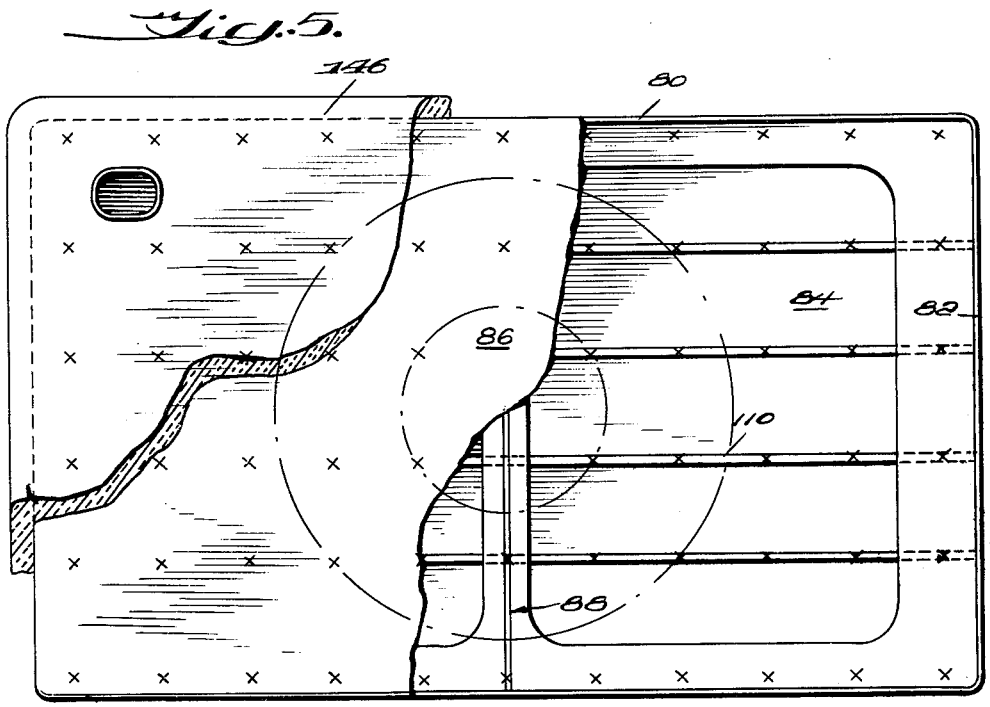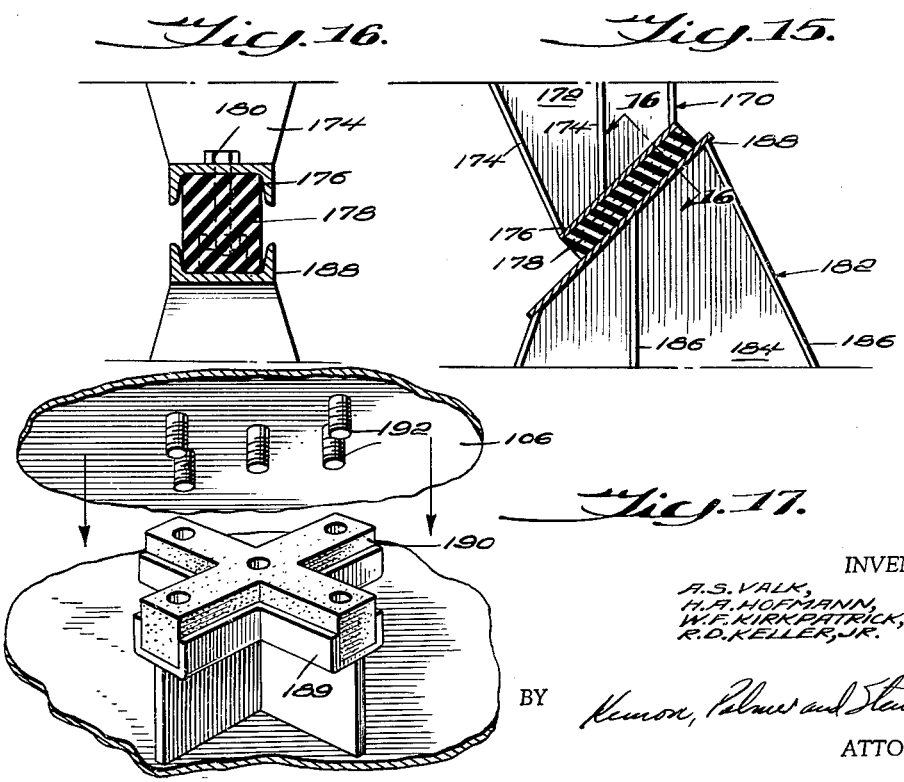

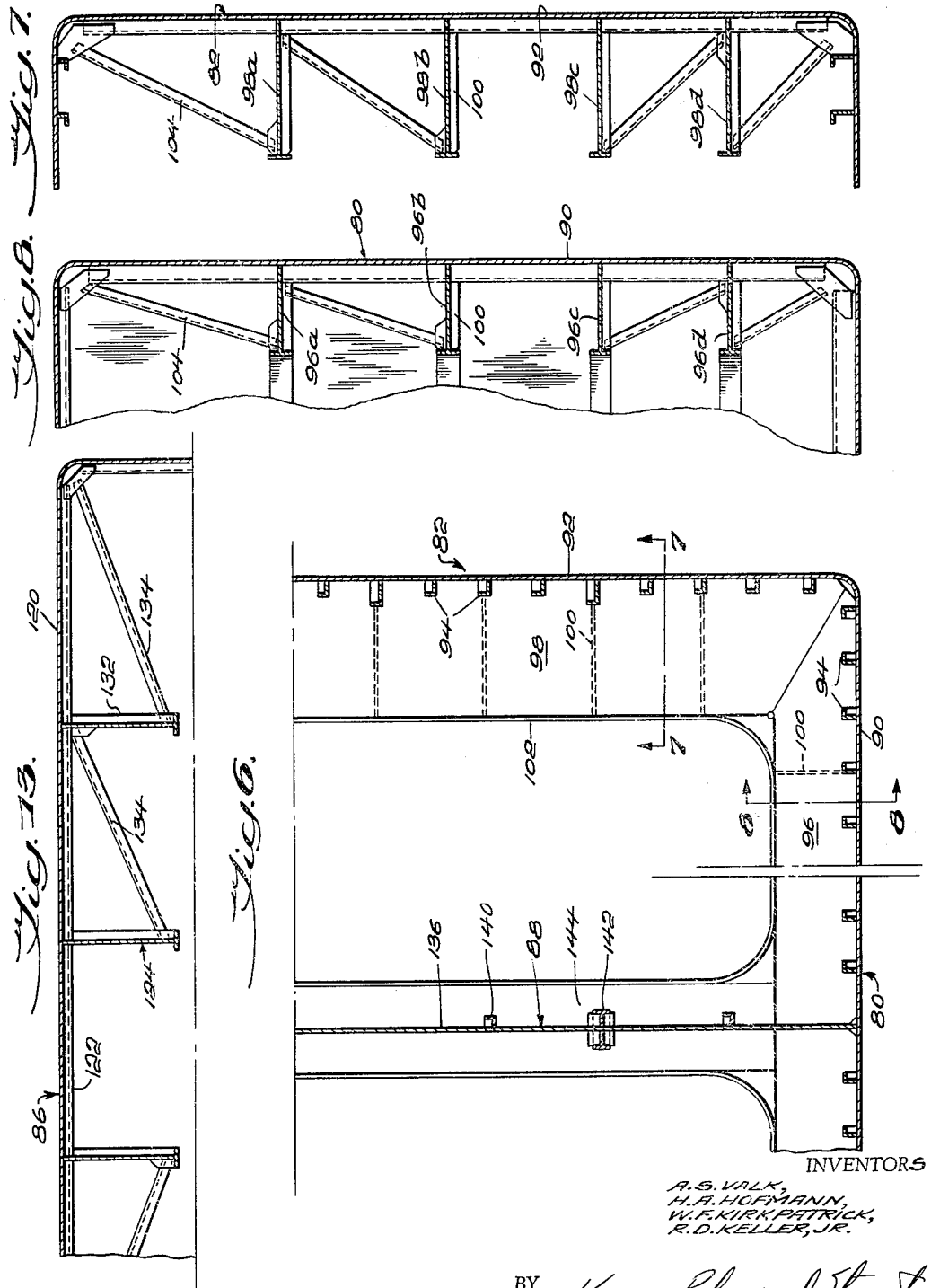

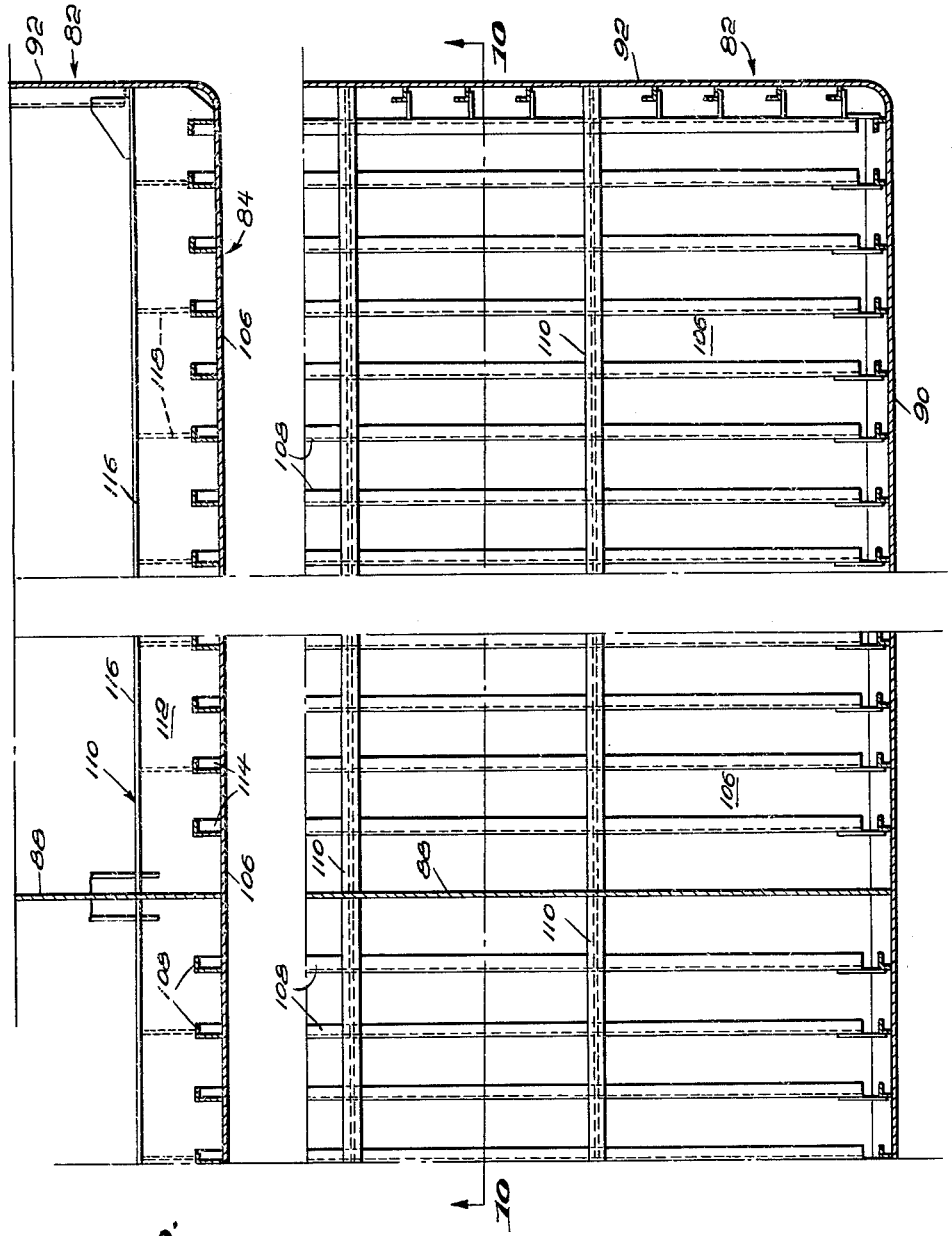

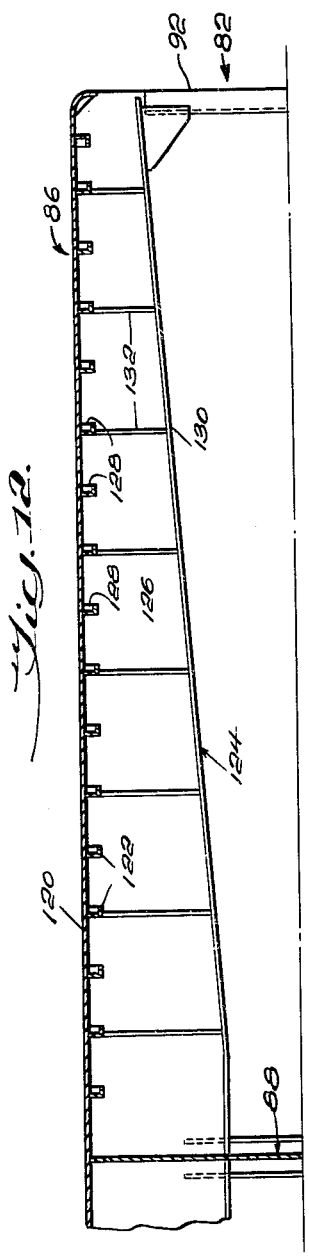
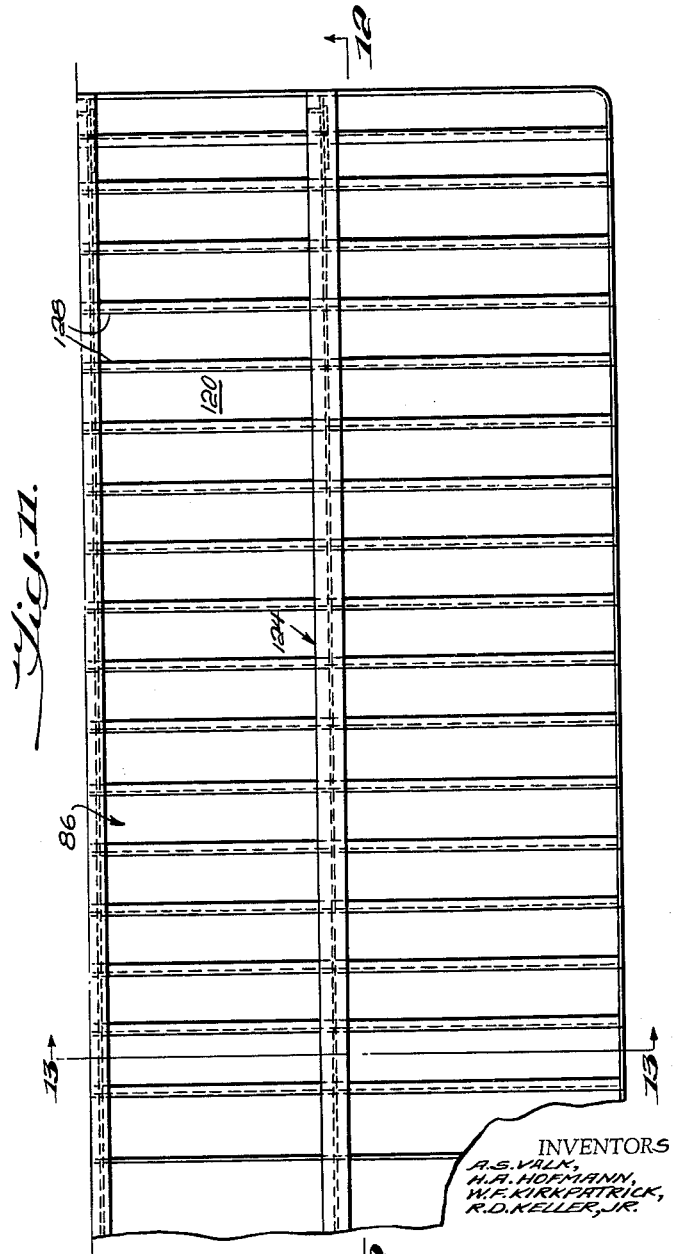

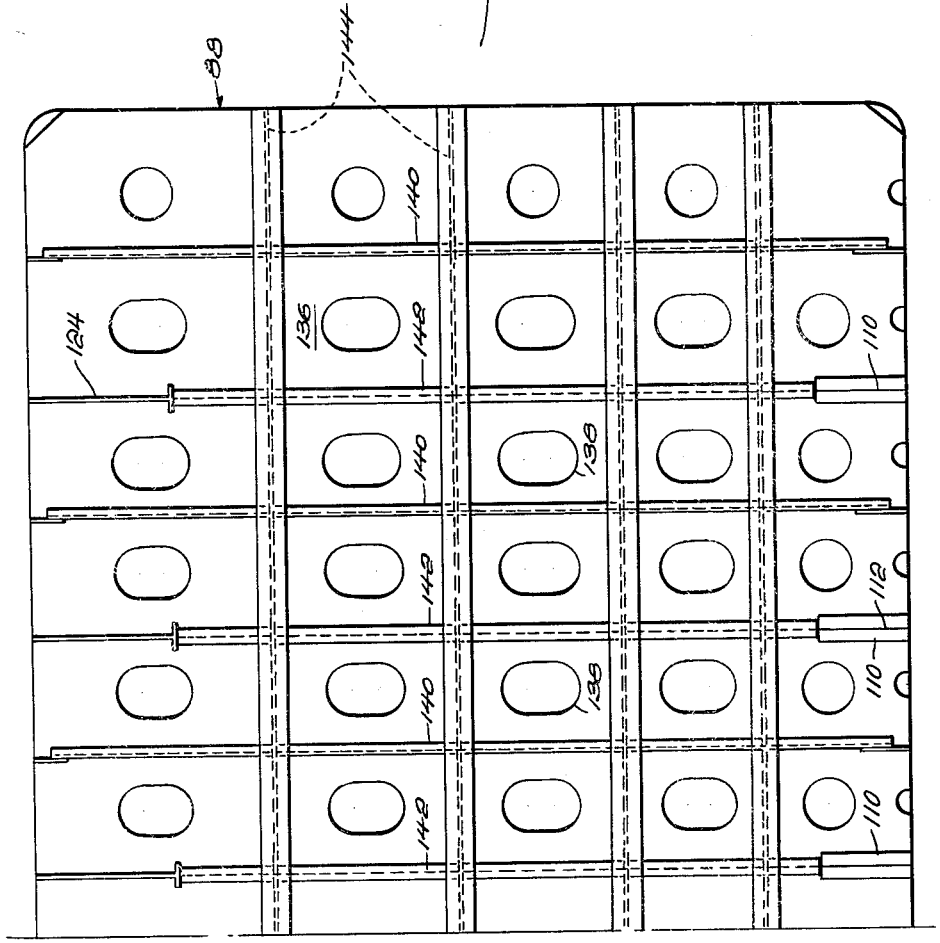

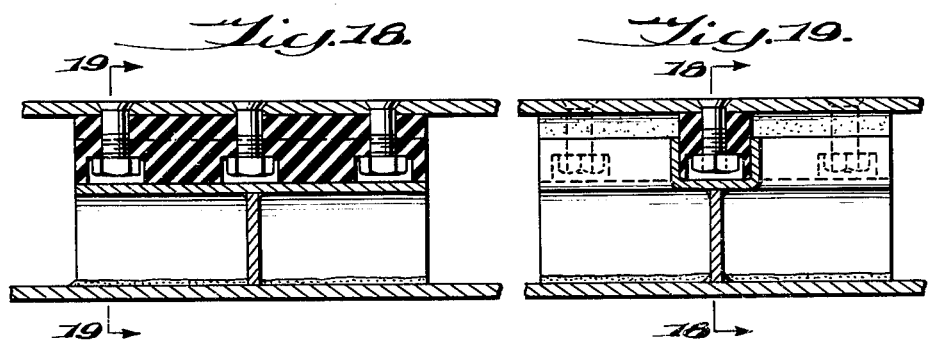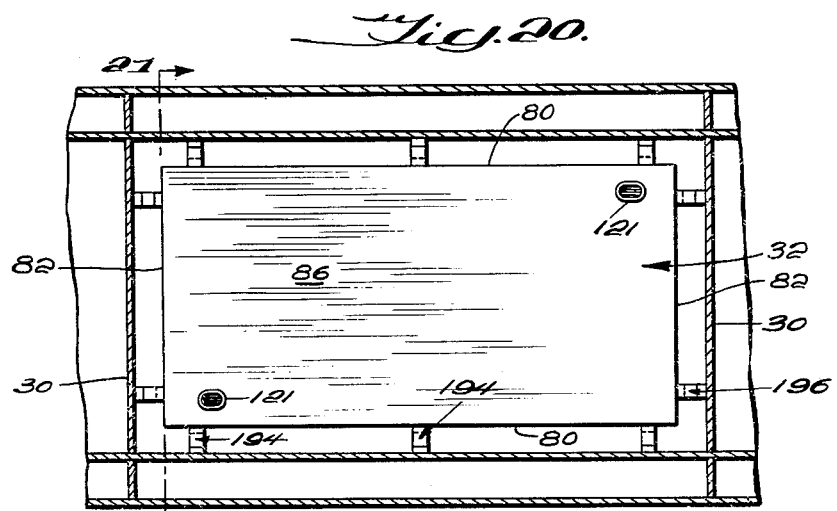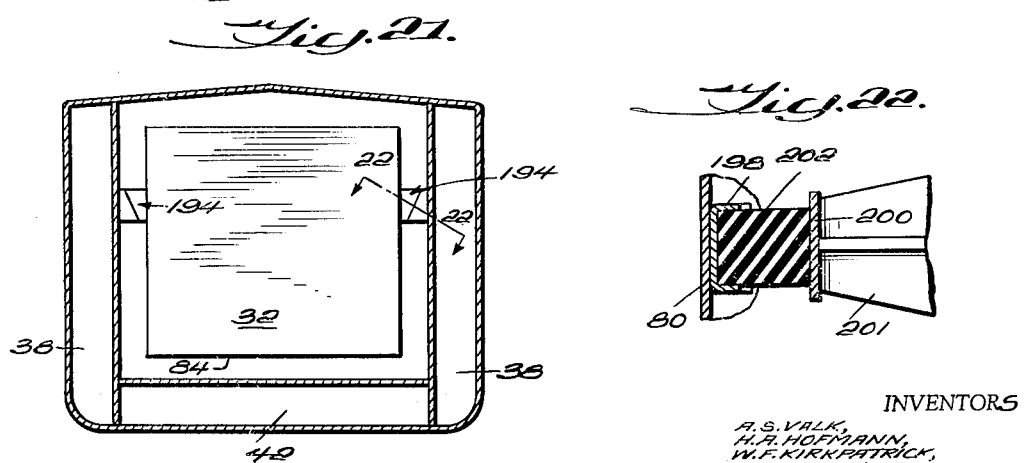

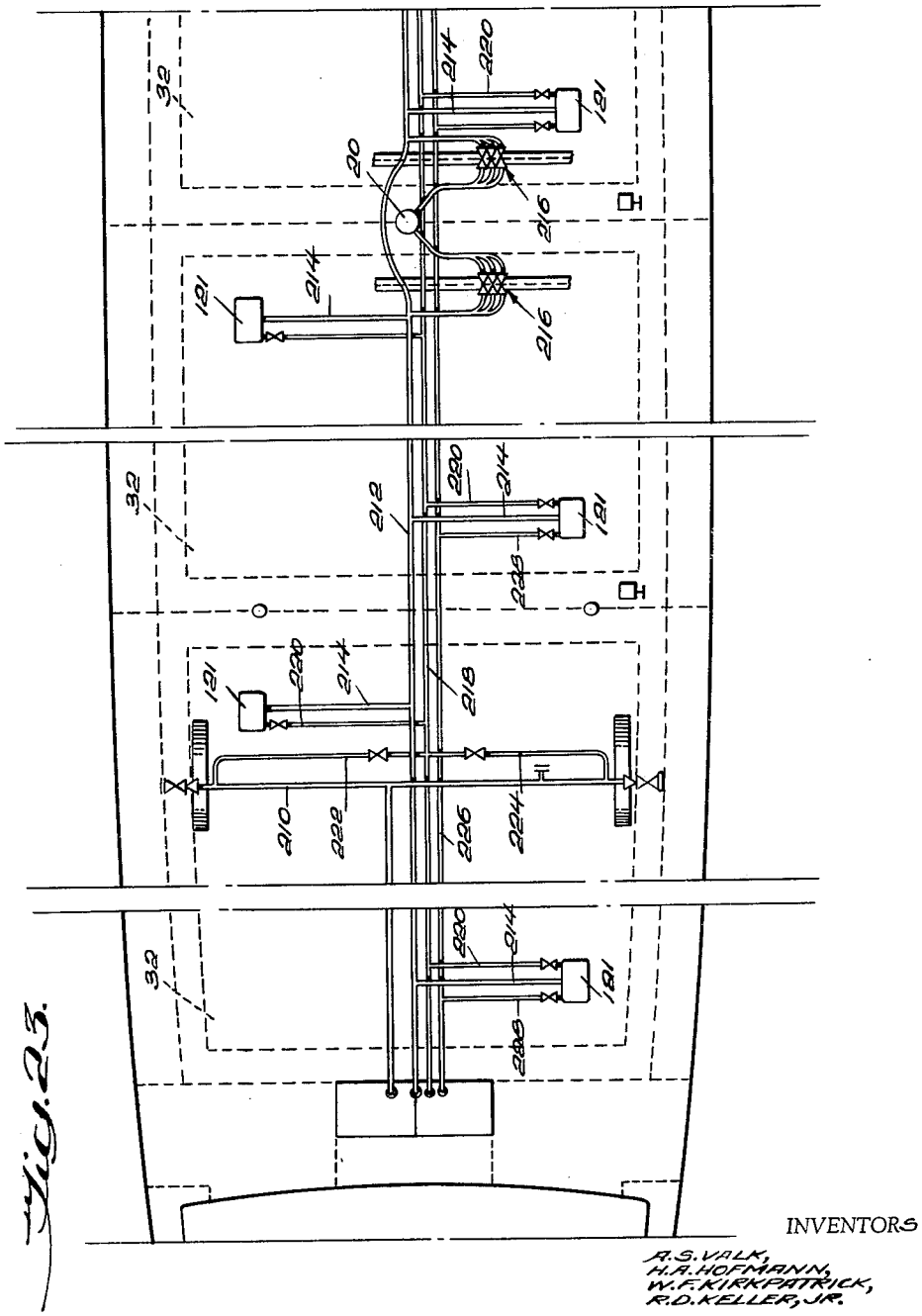

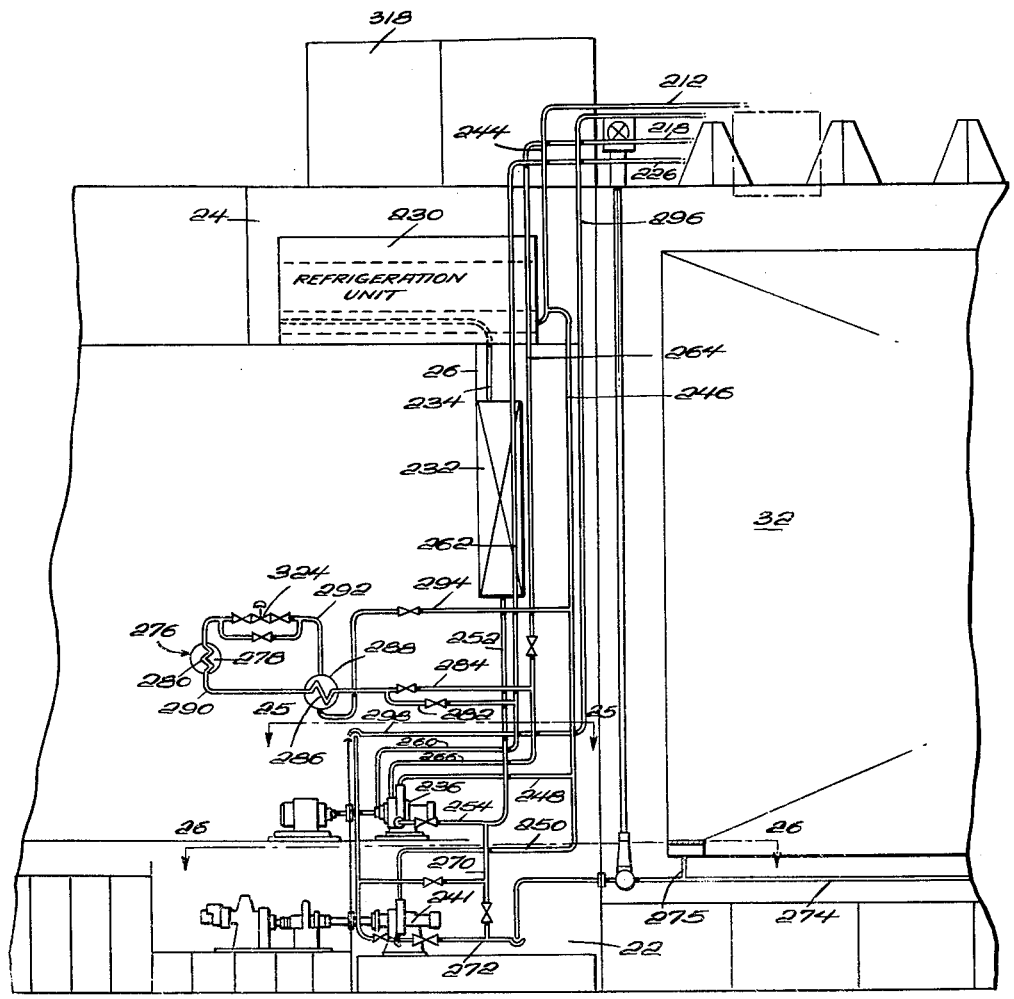

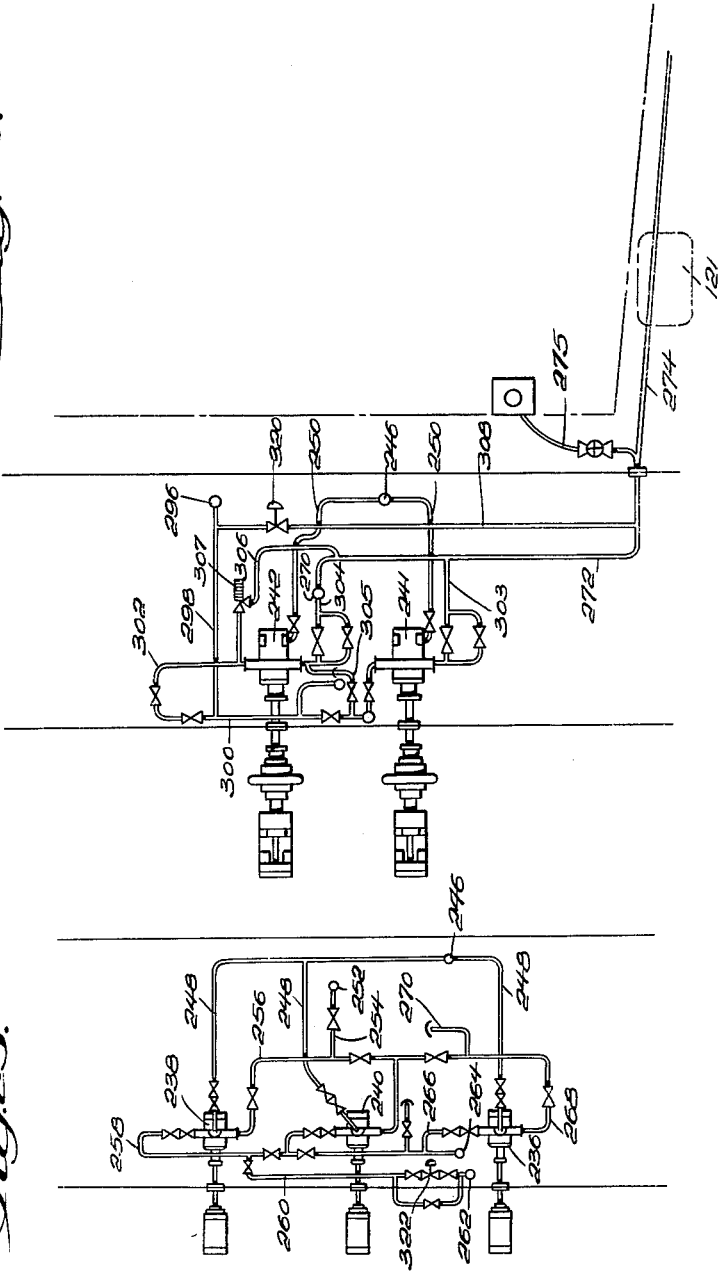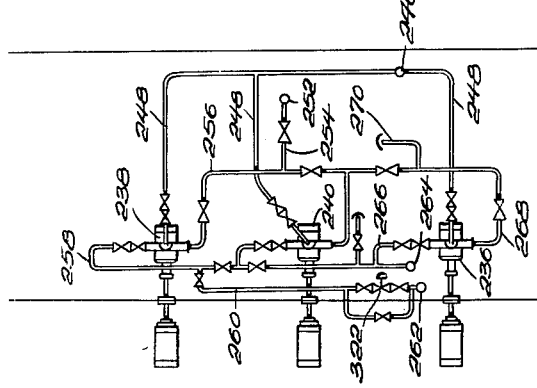

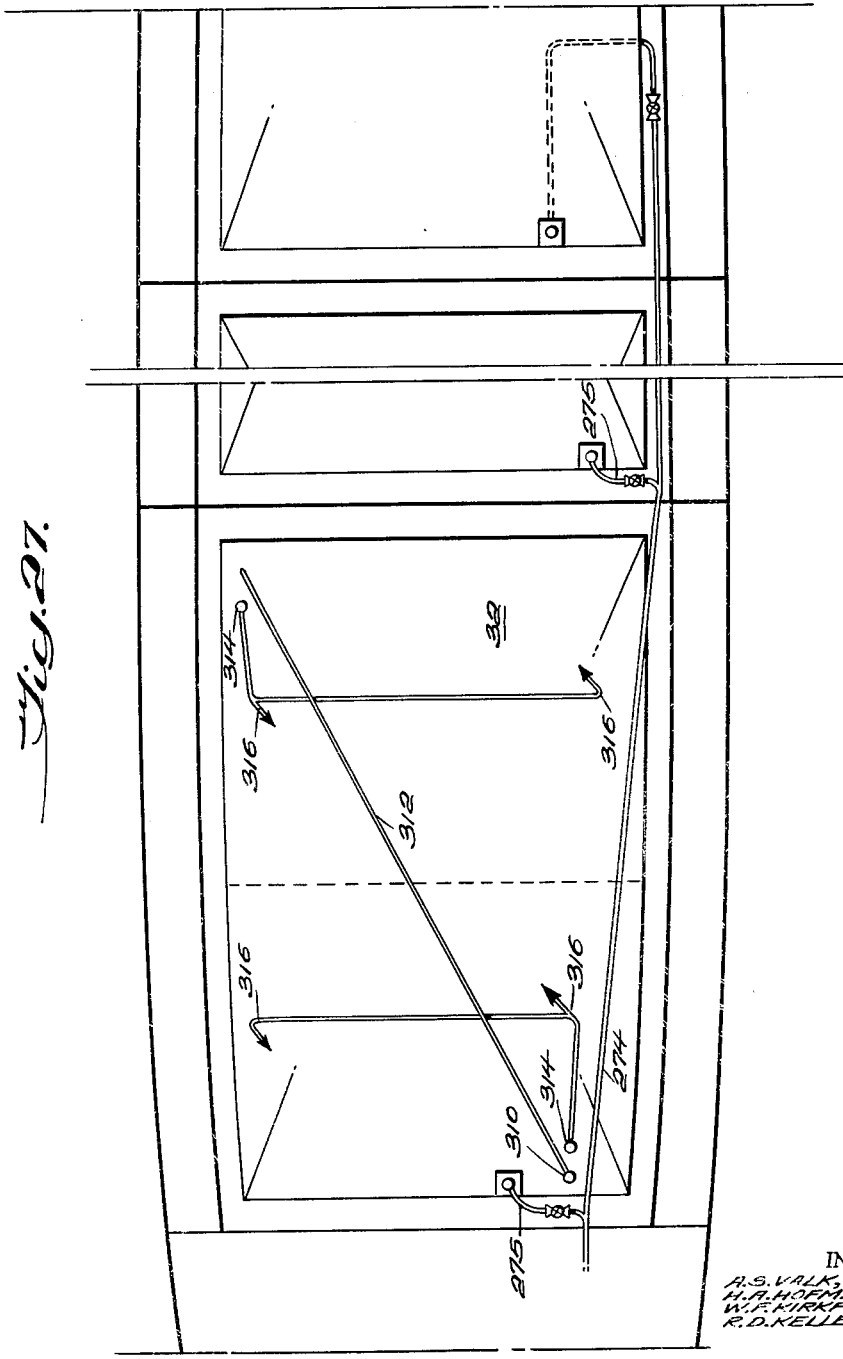

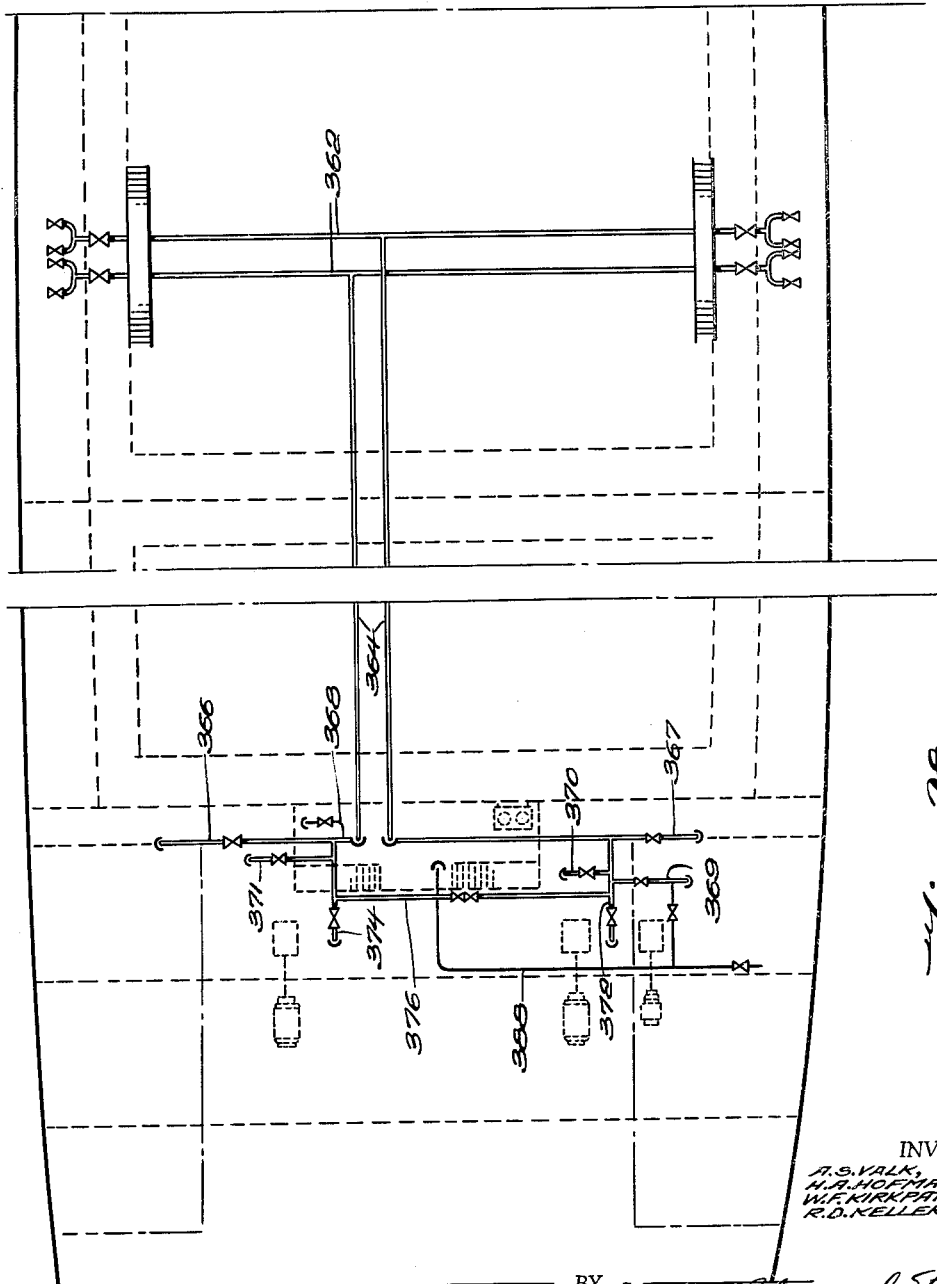

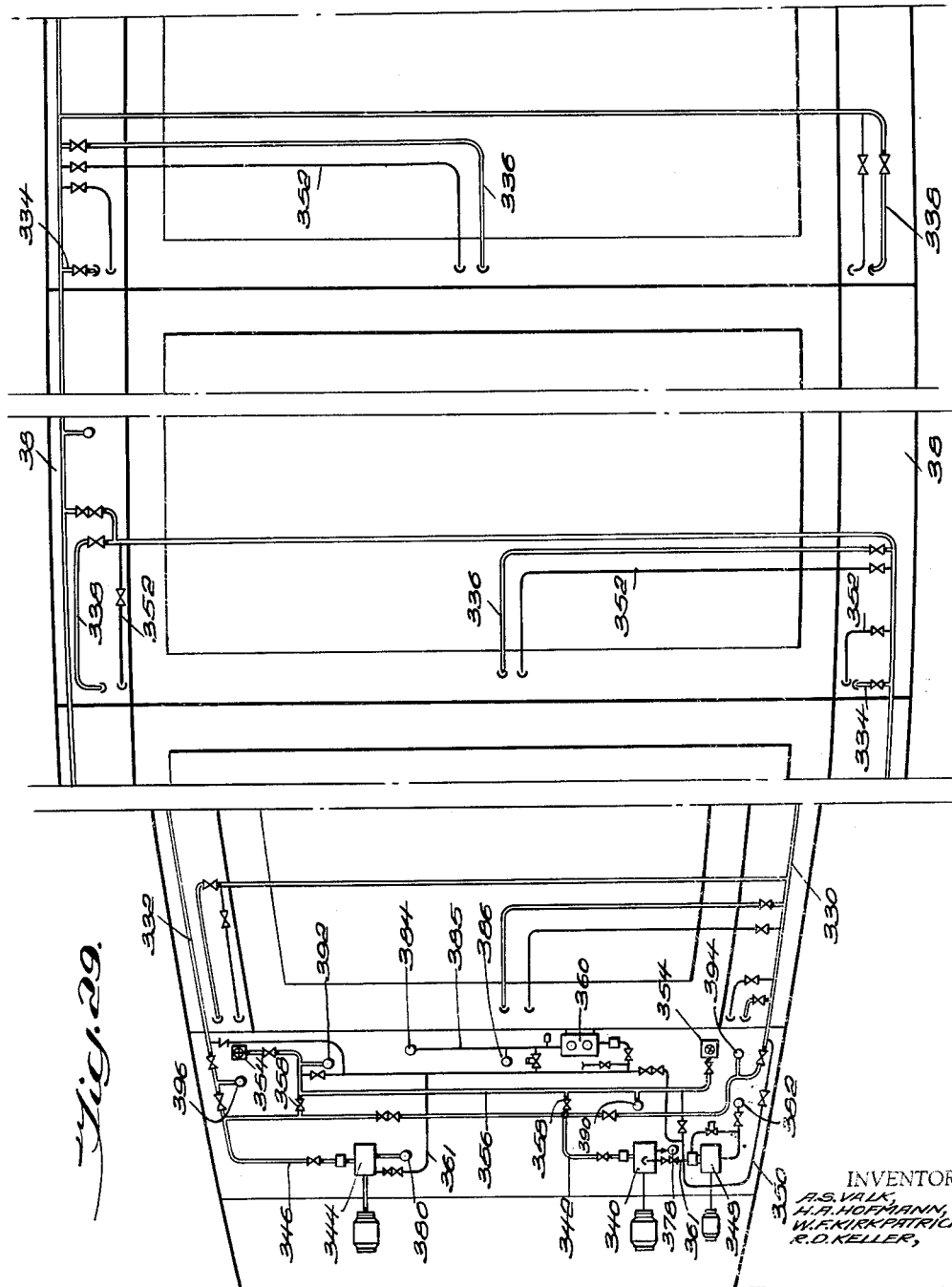

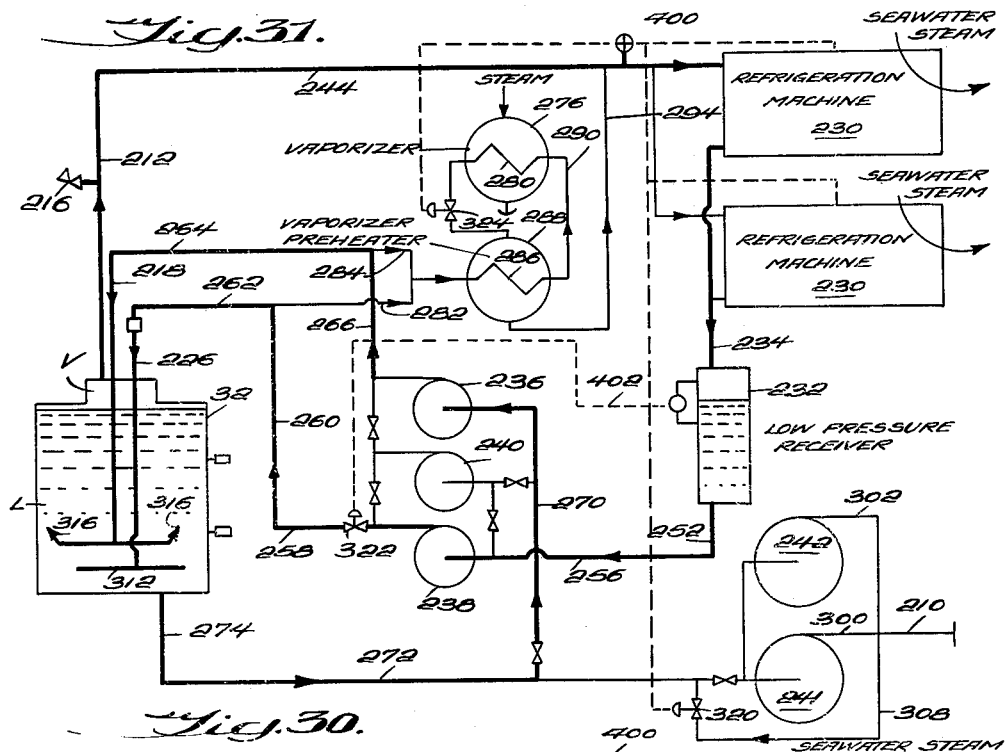

United States Patent Office 3,213,632
Patented Oct. 26, 1965

3,213,632
SHIP FOR TRANSPORTING LIQUEFIED GASES
AND OTHER LIQUIDS
Allen Schuler Valk, Chatham, N.J., Harry Alfred Hofmann and William Ferrier Kirkpatrick, Babylon, N.Y., and Robert Davidson Keller, Jr., Oak Ridge, Tenn., assignors to California Texas Oil Corporation, New York, N.Y., a corporation of Delaware
Continuation of application Ser. No. 13,101, Mar. 7, 1960. This application Mar. 23, 1964, Ser. No. 355,145
8 Claims. (Cl. 62—54)

This case is a continuation of abandoned application, Serial No. 13,101, filed Mar. 7, 1960.

This invention relates to the storage and transportation of liquids and liquefied gases. More particularly, it concerns the storage for transportation of liquefied gases having low temperature boiling points at about atmospheric pressures simultaneously with other liquid products of such characteristics that the vaporization thereof is not critical at normal pressures and temperatures.

*Field of invention*

In the transportation of liquefied gases which require either high pressures for normal ambient temperatures or low temperatures to maintain their liquid state at about atmospheric pressure, many severe problems arise especially when it is contemplated that these products be transported over water. Perhaps the most critical of these problems is the difficulty encountered in making most efficient use of the space available in the vessel or ship carrying these products because of the extreme temperatures and pressures involved. In order to overcome the weight, size and cumbersome configurations of containers necessary to hold the liquefied gases under pressure to prevent vaporization, it has been found desirable to store it on the ship at atmospheric pressure in tanks properly insulated and associated with a refrigeration plant for condensing any vapors which may evolve from the liquid. However, due to the low density of the liquefied gas cargo it is desirable to carry other, more dense liquid cargos such as crude oil, fuel oil, gasoline and the like to utilize the full dead weight capacity of the vessel and reduce thereby this cost of liquefied gas transportation. Moreover, since liquefied gas cargo tanks will in most instances be empty on return trips it is necessary to provide additional tank space for ballast purposes to make the vessel seaworthy. Yet, in ship constructions known prior to this invention, no completely satisfactory arrangements have been proposed by which these characteristics have been fully appreciated.

Another acute problem which must be faced in the transportation of liquefied gas on seagoing vessels is the design of an independent container structure which is large enough to contain a satisfactory quantity of liquefied gas; which is of a desirable shape or configuration from the standpoint of efficient space utilization; which is strong enough to resist both positive and negative pressures which may develop due to the extremely sensitive vapor characteristics of the cargo contained therein; which may withstand the unusually large stresses imposed on the walls thereof by the temperature extremes encountered and uneven expansion and contraction as a result thereof; and further, which may withstand the stresses developed by the dynamic movement of a ship at sea. Prior to this invention, no completely satisfactory tank structure by which all of the requirements aforementioned have been fully met has been available. Also, it has been found extremely difficult to satisfactorily insulate the tanks which contain the low temperature liquefied gas so that the abnormally low temperature will not have a deleterious effect on the surrounding ship structure. In one known construction, thermal insulation is placed completely over the interior of the vessel in which the containers are mounted to protect the vessel structure from the transfer of heat which may pass to the sub zero temperatures in the tanks. While this technique is satisfactory from the standpoint of providing an adequate thermal barrier between the tanks and the ship construction, it poses an acute problem of repairing the interior ship hull in the event such repair becomes necessary.

The problem of thermally insulating the tanks from the hull of the ship or vessel is also critical to the satisfactory design of mounting devices for retaining the independent tanks in place within the holds of the vessel in which they are carried. Although this problem has been recognized in constructions available prior to this invention, there has been no completely satisfactory solution by which both the structural requirements or strength necessary to hold the weight of the tanks and the liquid therein against movement with respect to the vessel under all of the conditions which might be expected to occur, and at the same time effectively insulate the tank thermally from the vessel structure so that substantially no heat leak occurs therebetween. Also, it is particularly desirable in many instances to space the tank from the surrounding ship structure, thereby increasing the difficulty of providing a suitably strong mounting which is also thermally insulative.

In addition to the foregoing, it is necessary to provide a vessel in which the liquefied gases are carried together with more normal liquid products such as gasoline or oil with a satisfactory system for handling the cargo during the loading, hauling and unloading operations. Except for the difficulties which might be encountered in satisfactorily fitting a ship with the necessary pumps and piping for handling the ordinary liquid cargo, this system in and of itself is of no great concern. In order to satisfactorily pump and handle the liquefied gas cargo on the other hand, a number of requirements must be met. First of all, the pumping means by which the liquefied gas cargo is pumped from the tanks to on-shore installations, must be positioned relatively low with respect to the level of the independent tanks so that a sufficient head of liquid always exists against the intake of the pumps. If this were not the case, low pressures would develop tending to flash the liquified gas into vapors. Another problem incicidental to the handling of the liquefied cargo, particularly during the transportation thereof, is that of thermal stratification within each of the tanks. This is the result of greater pressures existing at the lower portion of the tanks under the head of liquid therein, which higher pressures permit greater heat absorption, thus establishing a warmer stratum of less dense liquid in the lower portion of the tanks. When this occurs, should the vessel carrying the tanks be subjected to heavy seas, or for some other reason should the tanks become agitated such that the lighter liquefied gas is suddenly caused to rise in the tanks, the warmer temperatures thereof would cause it to flash into vapors creating abnormal pressures within each of the tanks. A still further problem which is presented in the storage of liquefied gases at low temperatures on transporting vessels is the possibility of vacuums being created in the tanks due to condensation of the vapors which might occur during conditions of low ambient temperatures present during winter seasons for example, or due to rapid fluctuations in barometric pressure. This problem also occurs when unloading liquid from tanks and should such a vacuum of any great magnitude develop, not only would severe stresses be imposed on the walls of the independent tanks but also, the possible admission of air through venting devices could produce such detrimental effects as introduction of moisture and mechanical malfunctioning due to freezing thereof, the formation of combustible mixtures and the like. Prior to this invention, the lack of means for overcoming these problems of pressure excesses has resulted in reliance on safety relief valves by which abnormal pressures beyond a very slight variation from atmospheric pressure are vented into the air. While such devices effectively control the pressures existing within the tank, they result in substantial losses of cargo, not to mention the fire hazards created by the extremely combustible mixture of the gas vapors and air in and about the ship.

*Objects*

A principal object of this invention is to provide a new and improved vessel for simultaneously transporting liquefied gases having low temperature boiling points along with other relatively non-volatile liquid products at normal temperatures at normal pressures, by which the problems previously encountered are effectively and substantially overcome.

Another object of this invention is the provision of a vessel in which liquefied gases may be transported at or about atmospheric pressures at temperatures corresponding to their boiling points, the vessel hull being effectively insulated therefrom and as well as capable of containing other liquid cargo or, if desired, sea water for ballast purposes.

A further object of this invention is that of providing a vessel in which liquefied gases may be transported at or about atmospheric pressures at temperatures corresponding to their boiling points in a manner such that tanks containing the liquefied gas are within fluid impervious holds to effect emergency containment of the liquefied gas and such that cargo and ballast tanks in the hull of the vessel protect the liquefied gas tanks from collisions.

An additional object of this invention is the provision of a new and improved tank for containing liquefied gases and receivable within the hull of a sea going vessel in a manner such that maximum use of the space therein is obtained.

A further object of this invention is the provision of a tank of the type referred to which is resistant to stresses imposed by both negative and positive internal pressures and which is also resistant to stresses imposed by differential amounts of thermal expansion and contraction and which will withstand the dynamic loads imposed by the movement of a vessel at sea.

A further object of this invention is that of providing a vessel of the type referred to with means for effectively mounting independent liquefied gas containing tanks therein in a manner such that no metal to metal contact exists between the vessel and the independent tanks and yet in a manner such that the independent tanks are immovable with respect to the vessel under the most extreme conditions.

Another object of this invention is the provision of means for mounting independent liquefied gas containers within a sea going vessel in a manner such that thermal expansion and contraction of the tanks in no way affects securement of the containers within the vessel.

A further object of this invention is the provision of extremely effective thermal insulation for insulating the cold liquefied gas containers from the vessel structure in a manner such that the usual maintenance requirements of the vessel are not impaired in any way.

Another object of this invention is the provision of a vessel of the type referred to equipped with means for effectively handling both the liquefied gas cargo and the other liquid cargo during loading, unloading and transporting operations.

A further object of this invention is that of providing a vessel of the type aforementioned with a refrigeration system operative in accordance with pressures existing within the liquefied gas containers to condense vapors that may be evolved therein and thus maintain the pressures existing within the containers at or about atmospheric pressure without loss of cargo.

Another object of this invention is the provision of a vessel of the type referred to in which liquefied gas may be transported without danger of thermal stratification and the resulting pressures incidental thereto.

A further object of this invention is the provision of a vessel for transporting liquefied gases at atmospheric pressure, which vessel is equipped with means for preventing the occurrence of abnormal vacuum or negative pressures within the liquefied gas containers.

A still further object of this invention is the provision of a vessel of the type referred to equipped with refrigeration means to facilitate the transportation of liquefied gases thereon as well as with means for generating vapors from the liquefied gas under conditions of extremely low ambient temperatures, thereby preventing damage to the refrigeration equipment and possible negative pressure in the cargo tanks.

Other objects and further scope of applicability of the present invention will be apparent from the detailed description given hereinafter. It should be understood, however, that the detailed description, while indicating preferred embodiments of the invention, is given by way of illustration only since it will be made apparent to those skilled in the art that various changes and modifications can be made without departing in any way from the true spirit and scope of this invention.

*General description*

In general, the aforementioned objects are accomplished by a ship or vessel construction in which the hull is formed having an exterior shell and a fluid impervious wall spaced inwardly therefrom on each side as well as an upwardly spaced, fluid impervious floor thereby establishing wing and floor tanks adaptable for the storage of ordinary liquid cargo such as oil, gasoline or the like. The hull is also divided longitudinally by a plurality of transverse bulkheads which define with the wing tanks, fluid impervious holds in which independent tanks for containing liquefied gases at atmospheric pressure and at sub zero temperatures may be mounted and which holds are capable of containing the liquefied gas in the event the independent tanks develop a leak or otherwise become defective. The tanks are internally reinforced in a manner so as to resist negative and positive pressures which develop incidentally to the handling of liquefied gases as well as to accommodate the variation in thermal expansion and contraction resulting from the temperature extremes involved. The tanks receive on their exterior surfaces, suitable thicknesses of thermal insulation so that the ship hull is not exposed to the extremely low temperature of the liquefied gases and the danger of weakening as a result thereof. The tanks are mounted in the hold of the ship hull in such a manner that all forces are resolved into compressional or shear stresses in blocks of thermally insulating material, thereby eliminating all metal to metal contact between the ship hull and the individual containers.

The vessel is provided with a pump room in which cargo pumps are provided for independently unloading the wing and floor tank cargos and the liquefied gas containers. In addition, the presure within the liquefied gas containers is maintained by either a vaporizer or a refrigeration system depending on the nature of pressures existing within the tanks.

The refrigeration equipment is used to condense vapors evolved in the tanks and thereby lowering the pressures existing therein while under some conditions, such as during the unloading operation and during conditions in which low ambient temperatures exist, the vaporizer is capable of vaporizing the liquefied gases to raise the pressure in these tanks and thereby alleviate the possibility of damaging negative pressures of vacuums. Also, the vaporizer may be used in conjunction with the refrigeration system to impose an artificial load on the refrigeration units to prevent the necessity for shutting off the refrigeration equipment as well as to prevent the damage which might result thereto upon continued running with no refrigeration load. In addition to the vaporizer and refrigeration unit, the vessel is equipped with suitable pumping and conduit means by which the liquefied gases are recirculated and thereby continuously stirred to prevent thermal stratification.

A more complete understanding of the new and improved vessel of this invention and its operation may be had by reference to the accompanying drawings, in which:

FIG. 1 is a side elevation of the vessel illustrating the general arrangement of various units therein;

FIG. 2 is a diagrammatic plan view of the vessel shown in FIG. 1;

FIG. 3 is an enlarged cross-section view taken along lines 3—3 of FIG. 2;

FIG. 4 is an enlarged fragmentary cross-sectional view of the vessel hull;

FIG. 5 is a plan view of the independent liquefied gas tanks of this invention with a portion of the top cut away to illustrate the interior thereof;

FIG. 6 is an enlarged fragmentary horizontal cross-section of the tank illustrated in FIG. 5;

FIG. 7 is a fragmentary cross-section taken along lines 7—7 of FIG. 6;

FIG. 8 is a fragmentary cross-section taken along line 8—8 of FIG. 6;

FIG. 9 is a fragmentary plan view of the floor of the tank shown in FIG. 5;

FIG. 10 is a fragmentary cross-section taken along line 10—10 of FIG. 9;

FIG. 11 is an enlarged fragmentary view looking up at the top of the tank shown in FIG. 5;

FIG. 12 is an enlarged fragmentary cross-section taken along line 12—12 of FIG. 11;

FIG. 13 is a fragmentary transverse cross-section of the tank top taken along line 13—13 of FIG. 11;

FIG. 14 is a fragmentary elevation of the transverse swash bulkhead of the tank shown in FIG. 5;

FIG. 15 is a side elevation in partial cross-section showing the new and improved tank mounting devices of this invention;

FIG. 16 is an enlarged fragmentary cross-section taken along line 16—16 of FIG. 15;

FIG. 17 is an exploded perspective view illustrating the mounting device adapted to support the center of the tank shown in FIG. 5;

FIG. 18 is an enlarged cross-sectional elevation of the mounting device shown in FIG. 17 and taken along line 18—18 of FIG. 19;

FIG. 19 is a cross-section taken along line 19—19 of FIG. 18;

FIG. 20 is a fragmentary plan view showing an auxiliary mounting device for the tank within the hold of the vessel;

FIG. 21 is a cross-sectional view taken along line 21—21 of FIG. 20;

FIG. 22 is a fragmentary cross-section view of the auxiliary mounting devices taken along line 22—22 of FIG. 21;

FIG. 23 is an enlarged fragmentary plan view illustrating the liquefied gas handling deck piping on the vessel of this invention;

FIG. 24 is a fragmentary elevation showing the liquefied gas handling pumps, piping and refrigeration equipment in the vessel of this invention;

FIG. 25 is a partial plan view taken along line 25—25 of FIG. 24 and illustrating the liquefied gas condensate return and recirculating pumps as well as the piping therefor;

FIG. 26 is a plan view taken along line 26—26 of FIG. 24 illustrating the liquefied gas cargo pumps of this invention;

FIG. 27 is a fragmentary plan view showing schematically the piping for the liquefied gas containing tanks of this invention;

FIG. 28 is a fragmentary plan view showing the deck piping for handling regular liquid cargo in the bottom and wing tanks of the vessel of this invention;

FIG. 29 is a plan view showing the cargo pumps and piping for loading and unloading the regular liquid cargo to and from the vessel of this invention;

FIG. 30 is a flow chart showing dramatically the refrigertion system of this invention during the loading operation;

FIG. 31 is a similar view showing the operation of the refrigeration system at sea;

DETAILED DESCRIPTION

The general arrangement and hull structure

Figure 32:
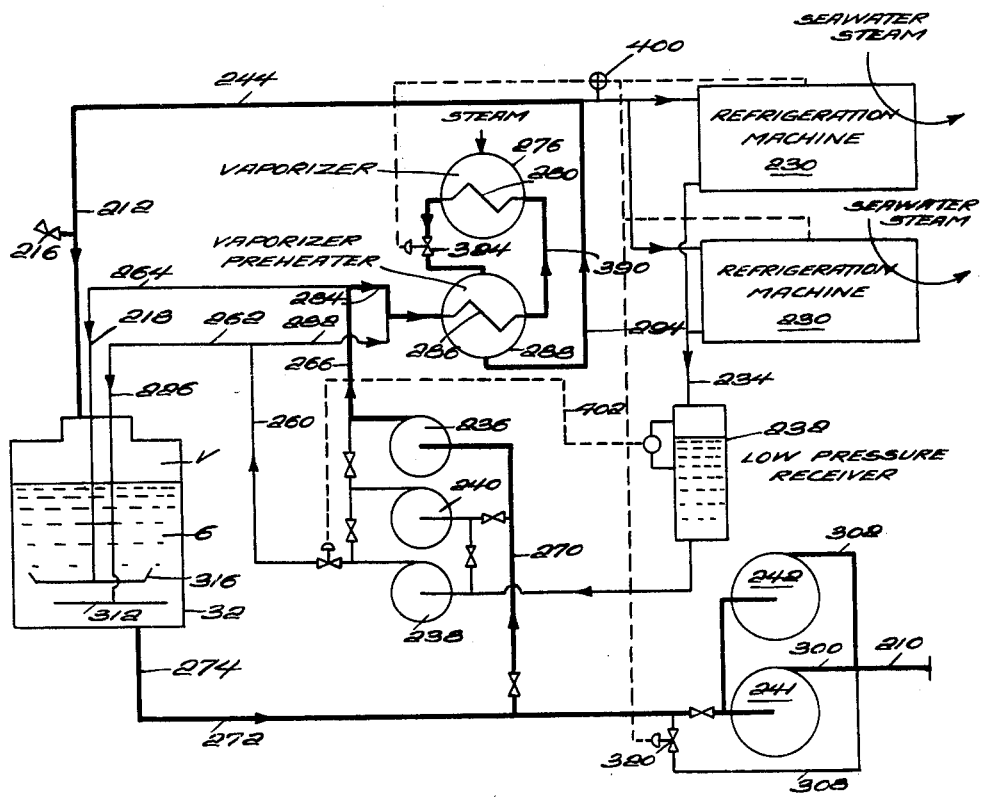
FIG. 32 is a flow chart illustrating diagrammatically the refrigeration system for the vessel of this invention during unloading operations.

The general arrangement of the vessel to which this invention relates as shown in FIGS. 1, 2 and 3 of the drawings includes a bow section 10, a midship section 12 and a stern section 14. The deck is of a conventional design having a midship-house 16 and a deck-house 18 aft on the stern section 14. In a generally central position on the deck is mounted a vent mast 20 which is connected with the liquefied gas system through relief valve devices in a manner which will be more fully described hereinafter. Likewise, the bow and stern sections are generally of conventional construction except that in the fore portion of the stern section a pump room 22 is provided which communicates with a refrigeration machine room 24 by way of a vertical passage 26.

The midship section of the vessel is separated into a plurality of holds 28 by transverse bulkheads 30 to enable a plurality of independent liquefied gas holding tanks 32 to be received herein. The hull structure of the vessel in which the holds 28 are positioned is formed having an outer shell 34 and inner vertical walls 36 which not only establish the transverse dimensions of the holds 28 but also serve with the shell as sidewalls of wing tanks 28 adapted to receive relatively non-volatile liquid cargo such as oil, gasoline or the like, of these tanks may be used to hold sea water ballast. It will be noted that the holds 28 in which the independent tanks 32 are received are, in effect, secondary tanks capable of containing the liquefied gas in the event the tanks 32 develop a leak or are otherwise damaged. This is essential in ships used to transport liquefied gas both from standpoint of safety and because it is required by governmental regulations. In a similar manner, a bottom floor 40 is spaced upwardly of the bottom shell to establish bottom cargo tanks 42. The wing tanks 38 as well as the bottom cargo tanks 42 are seprarated longitudinally by extensions of the transverse bulkheads 30. Thus, it will be seen that the midship section of the hull is made up of a series of wing tanks 38 aligned longitudinally of the vessel as well as the bottom cargo tanks 42 situated between the bottom shell and flooring of the vessel. Not only does this construction permit the economic advantages of a double pay load to be realized as well as enhancing the seaworthiness of a lightly laden ship, but also these wing and floor tanks, when filled, constitute a protective barrier for the liquefied gas tanks in case of a collision.

A better understanding of the hull structure aforementioned may be had by reference to FIG. 4 of the drawings which illustrates the structural details thereof. In accordance with conventional practice, the shell is formed having a bottom plate 43 connected to side plating 44 by the usual bilge strake 46. Likewise the upper portion of the side plate 44 terminates in a sheer strake 48. The shell is suitably reinforced by longitudinally extending stiffeners 50 which preferably take the form of inverted L-shaped members. The vertical wall 36 is constructed in a manner similar to the shell 34 in that it takes the form of a plate reinforced by longitudinal stiffening also comprising inverted L-shaped members 52. This same construction is carried on throughout the flooring 40. In order to provide additional strength and reinforcing as well as to suitably baffle the liquid retained in the wing tanks 38, transverse web plates 54 are affixed at their edges to the inner wall 36 and the shell 34. The transverse web, as can be seen in FIG. 4 is provided with rectangular cutouts 56 to receive the inverted L-shaped stiffeners 50 and 52 in the outer shell and wall respectively. Further, the web 54 is formed having apertures 58 to provide communication within the wing tanks for filling and emptying operations.

In like fashion, the bottom portion of the hull is reinforced with vertical webs 60 having apertures 62 cut therein. Also, it will be noted that both the transverse web plates 54 and 60 are provided with transverse stiffening members 64.

The deck is formed having a deck plate 66 suitably reinforced by longitudinally extending inverted L-shaped members 68, all of which is supported by a fabricated transverse girder 70. The girder 70 is of a conventional design and comprises a web 72, flange 74 and vertical stiffening brackets 76. Also, it will be noted that the deck plate is provided with a hatch opening or aperture 78 through which access may be had to the liquefied gas tanks positioned thereunder as will be more fully understood from the description which follows below.

The liquefied gas holding tanks

The individual liquefied gas holding tank structure will be most clearly understood by referring to FIGS. 5 through 13 in the drawings. As shown in FIG. 5, each tank is constructed having a pair of sidewalls 80, a pair of end walls 82, a bottom 84 and a top 86. Also, the tanks are divided longitudinally by a transversely extending swash bulkhead 88.

As shown in FIGS. 6, 7 and 8, the side and the end walls 80 and 82 respectively are formed having respective exterior shells or plates 90 and 92. In both instances, the plates 90 and 92 are directly attached to and supported by a plurality of vertically extending stiffeners 94 which are in the form of inverted L-shaped members. The shells 90 and 92 are further supported by horizontal webs 96 and 98 suitably stiffened by angle members 100 and having at their free edge a continuous flange 102, thus effecting a continuous girder structure. As shown most clearly in FIGS. 7 and 8, a plurality of horizontal webs or girders 96a, 98b, 98c, 98d are positioned in vertically spaced relationship along the interior of the side wall 80 and likewise a plurality of webs 98a, 98b, 98c, 98d are provided on the interior of the end wall 82. To support the interior ends of the transverse webs 96 and 98 and thereby retain them perpendicularly to the walls for maximum strength, angular bracket members 104 are provided substantially as shown.

It will be noted that the lower web members 96c, 96d, 98c and 98d are spaced to be closer together than the upper members 96a, 96b, 98a and 98b. The reason for this is that due to the head of liquid in the tank under normal, loaded conditions the forces acting on the lower portion of the vertical walls will be greater. Thus, the increased strength afforded by the more closely positioned reinforcing webs 96c, 96d, 98c and 98d will be appreciated. Also, since the webs 96 and 98 are completely independent of one another, there is no tendency for abnormal stresses to develop in the wall structure due to uneven temperatures existing vertically along the walls and the resulting expansion or contraction therein. In other words, the entire wall reinforcing structure is free to move with any change in dimensions which might occur in the walls and yet, under all conditions, the tank wall structure will resist equally well, internally and external pressures.

The tank bottom as shown in FIGS. 9 and 10, is formed having a bottom shell 106 directly backed up by a plurality of evenly spaced transversely extending inverted L-shaped members or stiffeners 108. Extending longitudinally of the tank are several girders 110 fabricated from a web 112 having cutout portions 114 to receive the transverse members 108 and terminating at its upper end in a flange 116. The web 112 may be further stiffened by brackets 118.

The tank top is constructed in a manner similar to the tank bottom in that it is provided with a shell 120 directly supported on L-shaped members or stiffeners 122 extending transversely thereof and provided with hatches or openings 121, on diagonally opposite corners. Longitudinal girders 124, having a web 126 cut out at 128 to receive the L-shaped members 122 are provided along lines coinciding with the lines established by the bottom girders 110. Also, each of the girders 124 is provided with a flange 130 at its lower edge and is suitably stiffened by vertically extending angle members 132. As shown in FIG. 13, the beams 124 may be supported against lateral displacement by brackets 134 extending between the lower edge of the girders 124 and terminating at a point adjacent the top plate 120.

The details of the transverse swash bulkhead 88 may be best understood by referring to FIGS. 6 and 14 of the drawings. As shown, the bulkhead preferably consists of a vertically extending plate 136, having a plurality of apertures 138 to permit only a restricted movement of liquid therepast. The plate 136 is reinforced by alternate angle members 140 and H-shaped members 142. The H-shaped members 142 are centered in the plane of the plate 136 and are anchored at their lower end on the longitudinally extending floor girders 112. Since the longitudinally extending top girders 124 are located in substantially the same plane as the bottom girders 112, these girders are supported at their mid points on the H-shaped members 142. To provide adequate transverse reinforcement, the plate 136 supports a plurality of horizontally disposed webs 144 which, as may be seen in FIG. 6, are continuations of the webs 96 and 98 on the side and end walls 80 and 82 respectively.

It is to be understood that the material from which all structural components of the tanks 32 are fabricated retains its strength at the low temperatures at which the liquefied gas is stored. For example, for relatively mild temperatures, low alloy nickel steel may be used whereas stainless steel or aluminum may be required if extremely low temperatures are contemplated.

As shown in FIG. 5 the tanks 32 are covered with a suitable thickness of thermal insulation 146 to isolate the cold temperatures within the tanks from the ship hull and as well, to prevent the leakage of heat into the tanks in amounts such that abnormal refrigeration loads are avoided. It is preferred that the insulation consist essentially of a plastic foam such as urethane foams or cellular glass block suitably cushioned. However, other thermally insulative materials may be used, such as for example, fiber glass, balsa wood, mineral wool, cork, glass wool and the like.

The tank supporting devices

To support the tanks 32 properly within their respective holds 28, the tank mounting devices illustrated in FIGS. 15 through 22 are preferred. In the form illustrated in FIGS 15 and 16 a plurality of depending brackets 170 are welded, riveted, bolted or otherwise affixed to the tank bottom plate 106. The depending brackets each comprise a web portion 172 suitably stiffened by a plurality of flange-like stiffeners 174, and terminate in inclined lower ends to which an inverted channel-shaped member 176 is affixed. Received within the open portion of the channel-shaped member 176 is a generally rectangularly shaped block of heat insulating material preferably of the type which is available commercially under the trade name "Micarta" though other materials having heat insulating characteristics along with sufficient strength characteristics under compressive and shearing loads could be used. The "Micarta" blocks 178 are preferably secured to the channel 176 such as by bolts 180. Complementing the bracket 170 and secured to the floor plate 40 of each of the holds 28, are brackets 182 each also being formed having a web 184, stiffened by flanges 186 and also terminating in an inclined upper end supporting an upwardly facing channel member 188. As can be seen by reference to FIG. 16, the "Micarta" block 178 is situated between the channel members 176 and 188 respectively so as to effectively insulate the brackets 170 and 182 thermally from each other.

The positioning of the brackets 170 on the bottoms of tanks 32 and correspondingly, the brackets 182 on the floor of the vessel holds is preferably such that the lower end of each of the inclined "Micarta" blocks 178 is facing the center of the tank 32 which it supports, and as will be seen by reference to FIG. 5 of the drawings, the brackets 170 are so located on the bottom of the tank that any force tending to move the bracket 170 outwardly with respect to the bracket 182 is resisted by a bracket or the resultant effect of brackets positioned oppositely of the tank center point therefrom. The preferred positioning of the supporting devices on the tanks is indicated by the crosses (X) in FIG. 5. As shown, all supports are positioned under the tank bottom girders 110 and thus along lines of maximum strength in the tank bottom.

Further, it is preferred that the supports are positioned on circles concentric with the center of the tank and on both ends of the respective circle diameters, thus assuring that an equal and opposite horizontal component of force is resisted to each support. However, it will be understood that a similar result may be obtained by positioning the supports equally spaced on each of the concentric circles, regardless of whether they diametrically are opposed.

The tank center is preferably though not necessarily supported on a pedestal which may be formed of intersecting webs as shown in FIG. 17 having an X-shaped upwardly facing channel 189 secured at the upper edge thereof, an X-shaped "Micarta" block 190 complementing the shape of the channel 189 received therein, and the tank bottom 106 received on the "Micarta" block 190. The block 190 is apertured to receive a plurality of stud bolts 192 secured in the bottom of the tank at the center thereof. These bolts function to secure the "Micarta" block to the bottom of the tank in a manner such that while adequate support is effected, no metal contact exists across the support.

Supplementing th supporting function of the brackets 170 and 182 at the bottom of the tank are a plurality of supports or chocks 194 and 196 secured to the sides and ends of the tank 32 and the sides and ends of the hold 28 in which the tank is situated. These are positioned at elevated points on the tanks 32 for the purpose of stabilizing the tanks against the forces developed by movement of the ship in rough seas. As shown in FIGS. 21 and 22, a wedge shaped block of "Micarta" or the like is suitably secured to the tank wall 80 such as by a channel number 198. The block 202 is opposed by an inclined plate 200 on the end of a bracket 201 secured to the walls of the hold.

To assure engagement of the block 202 with the plate 200 at all times regardless of dimensional changes which may occur in the tank 32 due to thermal expansion and contraction, the slope of the plate 200, and the exterior plane of the block is determined by the position of the block 202 in relation to the bottom of the tank and the width of the tank. Accordingly the vertical rise of the slope is proportional to the distances between the block and the tank bottom. Since blocks are located on both sides of the tanks, the horizontal run of the slope is proportional to half the width of the tank.

Thus, it will be seen that each of the tanks 32 is effectively cradled in the holds 28 in a manner such that they are completely insulated and spaced from the holds and vessel hull. They are supported in a manner such that any expansion or contraction due to the extreme thermal conditions involved in liquefied gas handling will be resolved into compressive and/or shear forces in the "Micarta" blocks 178. Moreover, due to the angle of the slopes in the chocks 194 and 196 adequate stabilizing support is afforded at all times.

*The liquefied gas handling system*

The piping system of the invention for handling the liquefied gas both in port and at sea may be understood by referring first to FIG. 23 in which the piping at deck level is illustrated. For the purpose of both loading and unloading the liquefied gas in port, a deck manifold 210 extends transversely across the midship section 12 and carries at its ends suitable valving and coupling means to which on-short conduits may be satisfactorily connected. A vapor header 212 extends longitudinally of the deck from which branch lines 214 extend to each of the tank hatches 121 for each of the tanks 32 respectively. The vapor header 212 is connected through relief valve groups 216 to the vent-mast 20 in the central portion of the deck. The relief valves 216 are of the type which are sensitive to both positive and negative pressures, thus providing safety means by which either excess pressures or excess vacuums may be avoided in the tanks 32.

Next, we note the provision of a recirculating header 218 also extending longitudinally of the deck and having branch lines 220 extending to both hatches 121 of each of the tanks 32 to enable recirculation of the liquefied gas in the tanks for purposes as will be more fully explained hereinafter. Also, branch lines 222 and 224 are connected to the recirculating header 218 and with the manifold 210 for cooling purposes during loading and unloading operations.

A condensate return header 226 is the last of the conduits extending longtudinally on the deck and it also is provided with branch lines 228 extending to at least one hatch 121 of the tanks 32 for the purpose of returning condensed liquefied gases to the tanks after it has been processed by a refrigeration system which will be described more fully below.

In FIG. 24, the liquefied gas piping, pumping and refrigeration apparatus is shown in elevation to illustrate their relative positions in the refrigeration room 24, vertical passage 26 and pump room 22 of the vessel's stern section. The refrigeration equipment necessary to condense vapor generated in the liquefied gas tanks due to heat leak and other causes is designated by the numeral 230 in the drawings and located in the refrigeration room 24. The refrigeration apparatus may consist of one, two or more units to lend versatility to the system, each unit in and of itself being available commercially and therefore not part of this invention. Preferably, however, the units are of the type incorporating a centrifugal compressor for a refrigerant such as Freon-12 which compressor may be driven by a rotary steam turbine. Each unit, as will be understood by those familiar in the art, further includes a condenser for the refrigerant or Freon-12 in this instance, which condenser utilizes sea water to assist in the refrigerant condensing step. Also, each unit will include low temperature cooling coils through which the liquefied gas vapors will be fed, reduced to a temperature less than their boiling point and thereby condensed into liquid.

In the vertical passage 26 and below the refrigeration room is a low pressure receiver to receive or collect the condensate of liquid passing from the refrigeration unit 230 through a conduit 234.

The pump room 22 is designed to house at a slightly elevated level at least two pumps 236 and 238 for effecting recirculation of the liquefied gas cargo and for returning the condensed liquid from the receiver 232 back to the tanks through the condensate header 226. The relative horizontal positioning of the pumps 236 and 238 may be seen in FIG. 25. A third pump 240 is provided for emergency purposes and is connected to the piping system in such a manner that it may be used to replace either the recirculating pump 236 or the condensate pump 238. Also, it will be noted that the level of the pumps 236, 238 and 240 is near the bottom of the tanks 32 to assure that a head liquid is maintained thereon at all times. Since these pumps will be used principally at sea or when the tank 32 contain a substantial amount of liquefied gas, it is not necessary that they be positioned at a level lower than the floor of the tanks 32.

A pair of liquefied gas cargo pumps 241 and 242 are positioned below the recirculating and condensate pumps 236 and 238 in the pump room 22. These pumps are used exclusively to pump the liquefied gas cargo from the tanks 32 through the cargo manifold 210 on the deck and to an on-shore installation. Because of this, and in order to enable complete emptying of the tanks 32, the elevation of these pumps is below the lowest portion of the tanks 32 to assure a back head of liquid at all times during the unloading operation. The relative horizontal positioning of the cargo pumps 241 and 242 on the floor of the pump room may be seen by reference to FIG. 28 of the drawings.

Referring now to the piping through which the liquefied gas cargo in both vapor and liquid phases is passed, it will be noted in FIG. 24 that the vapor header 212 terminates at its aft end in a downwardly extending line 244, which terminates in the refrigeration unit 230. Connected to the vapor line 244 is a riser 246 into which branch lines 248 and 250 extend. The branch lines 248 and 250 are connected to the casings of pumps 236, 238, 240 and cargo pumps 241 and 242 respectively. Because of these connections, any vapor which may develop during pumping of the liquefied gas cargo will be fed back to the tanks 32 through the riser 246, line 244 and header 212, or to the refrigeration unit 230 depending on the conditions under which the pumps are operating.

In order to feed the condensed or liquefied gas from the low pressure receiver 232 to the condensate pump 238 a downwardly extending line 252 is connected at its lower end to a horizontal conduit 254, which feeds into the condensate return pump 238 by way of a conduit 256. The output of the pump 238 is directed through a conduit 258 which is tapped by a line 260, the line 260 in turn feeding into a condensate return riser 262. The riser 262 as shown in FIG. 26 is coupled at its upper end to the condensate return header 226.

The recirculating header 218 extending longitudinally on the vessel's deck is fed by a recirculating riser 264 which in turn is fed by an output line 266 extending from the recirculating pump 236. A recirculating pump intake line 268 is fed by a line 270 which taps into a cargo pump suction line 272 at the cargo pump level. The cargo pump suction line 272 as will be seen by referring to FIGS. 24, 26 and 27 is a continuation of a tank loading and unloading main 274 connected with outlets in each of the tanks 32 by branch line 275.

Under certain conditions as will be described more fully hereinafter, it may be desired to vaporize quantities of the liquefied gas. For this purpose, a vaporizer 276 having a steam chamber 278 and a coil 280 is arranged to be fed by either lines 282 or 284 extending from either the condensate return riser 262 or the recirculating riser 264 respectively. The lines 282 and 284 feed through the coil 286 of a preheater 288. A line 290 extending from the coil 286 feeds the preheated liquid into the vaporizer 276. The output of the vaporizer 276 is through line 292, the preheater 288 and line 294 which feeds the vapor line riser 246.

The liquefied gas cargo manifold 210 at deck level is fed by a riser 296. The riser 296 is arranged to be fed by a horizontally extending line 298 which in turn receives the output of cargo pump 241 through a line 300 and the output of cargo pump 242 through a line 302. Each of the cargo pumps 241 and 242 is furnished a separate inlet 303 and 304 respectively connected to the cargo pump suction line 272 thus permitting parallel operation of these pumps. Should the discharge pressure delivered by these pumps be less than that which is needed to deliver the liquid to the shore, the output of the pump 241 may be directed into the pump 242 through a valved conduit 305 and the pumps thus operated in tandem or serially. Also, to limit the head against which the pumps 241 and 242 will pump is bypass 306 having a pressure responsive valve 307 extend from the outlet 302 back to the suction line 272.

During the loading operations the liquefied gas is pumped to the tanks 32 by shore pumps close to the shore supply tank so that the cargo pumps 241 and 242 are not needed. Accordingly, a loading line 308 is connected to the line 298 and feeds into the main 274.

The connection of the recirculating header 218 and condensate return header 226 to the tanks 32 as indicated previously, is by way of branch lines 220 and 228 respectively. As will be best understood by reference to FIG. 27, each of the branch pipes 228 extending from the condensate return headers 226 feed into downwardly extending pipes 310 which terminates at the lower end thereof in a distributing header 312 extending diagonally across the tank at the bottom thereof. The recirculating branch lines 220, on the other hand, feed into vertical pipes 314 extending through each hatch of each tank, which in turn feed nozzles 316. Because of the nozzles 316, the liquid in the tanks 32 may, under some conditions be continually recirculated and stirred, thereby preventing thermal stratification and consequent vapor evolution which might form as a result thereof. Also, it will be understood, that while only one of the tanks 32 is shown in FIG. 27 to be equipped with the header 312 and nozzles 316, it will be understood that in practice, all tanks will be so equipped.

Control of the pumps and valve mechanisms as well as the refrigeration units is brought about by control apparatus contained in a control room 318 to bring about the various operational characteristics which will be described more fully below. Although the system incorporates many manually and automatically operated valves as will be apparent to one skilled in this art, the valve mechanisms deemed necessary to discuss herein for a full understanding of the functioning of this invention consists of the loading control valve 320, a low pressure receiver level control valve 322 and a vaporizer control valve 324. These valves along with the refrigeration units 230 are arranged to be controlled by a fluid pressure system (not shown) which is sensitive to pressures existing within each of the tanks 32.

*Ordinary liquid cargo handling system*

In FIGS. 28 and 29, is shown the piping and pumping system for loading and uloading the wing tanks 38 and the bottom tanks 42 with petroleum products such as oil, gasoline and other relatively non-volatile liquids (at normal pressure and temperature) or alternatively with sea water for ballast purposes. This system includes a pair of main conduits 330 and 332 extending along the lower edge of the vessel. Each of the mains 330 and 332 are equipped with or connected to branch lines 334 and 336 and 338, extending to the wing tank 38 on one side, the floor tank 42 and the wing tank on the other side respectively. The aft end of the main 330 is in fluid communication with a cargo pump 340 through conduit 342, while the main 332 is correspondingly connected to a second cargo pump 344 through line 346. A stripping pump 348 is provided for the purpose of removing the remainder of cargo from the tanks after the principal amount thereof has been pumped out by the cargo pumps 340 and 344. The stripping pump intake is connected with a line 350 which taps into the main 330 and also it will be noted that the mains are provided with stripping branches 352 extending to the respective wing and floor tanks. A pair of sea chests 354 are situated in the sides of the vessel from which sea water may be pumped into the wing and floor of the tanks as desired for ballast purposes. The sea chests as shown in FIG. 31 are connected by a pipe 356, which in turn may be opened to the intake of cargo pumps 340 and 344 by way of valved lines 358. A bilge pump 360 is also provided in the pump room for pumping bilge water therefrom. The pump 360 may also be used as a stripper pump in the same manner as pump 348.

It will be noted that the stripper pumps are connected by lines 361 to the casings of cargo pumps 340 and 344 for priming purposes as well as to alleviate vapor lock problems. As shown in FIG. 28, a pair of deck manifolds 362 are provided and outfitted with suitable attaching means by which on shore equipment may be attached thereto for loading and unloading purposes. Extending from the manifolds 362 are a pair of cargo mains 364 to which are connected loading branches 366 and 367, stripping branches 368 and 369, ballast line branches 370 and 371, and a pair of cargo pump discharge branches 372 and 374. The cargo branches are connected by a crossover conduit 376.

The discharge of pumps 340 and 344 is through risers 378 and 380 respectively which risers are connected at their respective upper ends with branch lines 372 and 374. In like fashion, the discharge of the pump 348 is through a riser 382 connected at its upper end to branch line 369, while a riser 384 at the end of a pump discharge line 385 connected to pump 360 terminates at its upper end in the stripper branch 368. A riser 386 is also connected to the bilge pump discharge line 385 and is connected at its upper end to an overboard discharge line 388. Ballast water risers 390 and 392 are connected at their upper ends to the ballast water branch lines 370 and 371 respectively. Likewise, the loading branches 366 and 367 are connected to the main conduits 330 and 332 by loading risers 394 and 396.

*Operation*

Except for the handling of cargo and operations incidental thereto, the general operation of the vessel to which this invention relates is conventional. The operation of the cargo handling systems will be controlled preferably from the control room 318 through usage of conventional remote control apparatus for actuating valves, pumps and other such equipment.

It is contemplated that the liquefied gas cargo will consist essentially of liquefied petroleum gases (L.P.G.) such as pure propane, mixtures of propane and butane or of propane, butane and pentanes which remain in a liquid state at atmospheric presure while at temperatures as low as approx. —45° F. When operating at this temperature range, the insulation about the exterior of the tanks 32 is sufficient to protect the hull of the vessel from the deleterious effects of such low temperatures. However, other liquified gases such as methane, ethane, helium, hydrogen and nitrogen which must be maintained at much lower temperatures to remain liquefied at atmospheric pressure may be transported in the tanks 32 by either increasing the amount of thermal insulation about the tanks or by placing a heating system between the tanks and the hull. Such a system might take the form of steam pipes situated between the tanks and the hull or this problem might be solved by merely circulating warm air or the like in the space between these members.

To load the wing tanks 38 and the bottom or floor tanks 42 with such petroleum products as oil, gasoline and the like, the on-shore pumping equipment is connected with the deck manifolds 362 and the cargo is pumped through the lines 364, the loading branch lines 366 and 367, downwardly through the loading risers 394 and 396 and into the main lines 330 and 332. From the mains the cargo will be fed to respective floor or wing tanks as desired.

Under some circumstances, such as for example on return trips or the like, it may be desirable to fill one or more of the wing tanks 38 or the floor tanks 42 with sea water ballast. To accomplish this, the cargo pumps 340 and 344 are turned on and the valved conduits 358 leading from the sea chests 354 are opened. Also, the valves in the pump discharge branch lines 372 and 374 as well as the valves in the loading branches 366 and 367 are adjusted so that these branches communicate. Thus, the sea water is pumped from the sea chests 354 through the pumps 340 and 344 upwardly through the pump discharge risers 378 and 380 through the pump discharge branches 372 and 374 and the loading branches 366 and 367, thence downwardly through the loading risers 394 and 396 and into the mains 330 and 332. The valves provided on various branches 334, 336 and 338 may be properly adjusted to fill the desired tank or tanks with sea water.

To unload cargo from the wing tanks 38 and the floor tanks 42, the valves in the branch lines 334, 336 and 338 along with those in the main lines 330 and 332 are adjusted to communicate with the intake lines 342 and 346 of the cargo pumps 340 and 344. The cargo is then discharged from the pumps through the pump discharge risers 378 and 380, the pump discharge branches 372 and 374, the deck lines 364 and into the loading manifolds 362.

After the level of the cargo in the tanks 38 and 42 is reduced to a point where too great a vacuum is required of the cargo pumps 340 and 344 for effective operation thereof, the stripping pumps 348 and 360 are put into operation. Thes low volume, high vacuum pumps then continue to pump the cargo upwardly through the stripping risers 382 and 384, the stripping branch lines 368 and 369 and into the deck lines 364 to the manifold 362 in the manner similar to the cargo pump discharge aforementioned. The stripper pumps 340 and 348 may be also employed for priming purposes or to alleviate vapor problems in the cargo pump 340 and 344 such as may arise due to the handling of gasoline or the like. For this purpose, they are connected with the casings of pumps 340 and 344 through the conduits 361 and discharge into the cargo lines 364 in their normal manner. When it is desired to use the stripper pumps as bilge pumps, the intake connections thereto are switched over to bilge suction lines and the discharge of the pumps through the riser 386 and 382 and into the bilge water discharge line 388.

An understanding of the operation of the liquefied gas handling system of this invention may be had by referring to FIGS. 30, 31 and 32 of the drawings in which the principal conduits and operating components thereof are illustrated in flow diagrams. Prior to describing the operation of the liquefied gas handling system, however, it will be understood by those familiar in this art that the liquefied gas tanks, when loaded, will contain in addition to liquid L a substantial quantity of vapors V. Further, since the space occupied by the liquefied gas is greatly reduced from that which it would occupy in a gaseous state, the pressures existing within these tanks 32 will be directly dependent upon the relative proportion of gas and liquid therein, and since it is desired to maintain pressures existing within the tanks 32 at atmospheric presure or slightly in excess thereof, it is contemplated that the operating liquefied gas handling system for either vaporizing or condensing the liquefied gas will be dependent upon the pressures in the tank. Accordingly not only excess pressures will be presented but also excess negative presures or vacuum. For this purpose, an air system is provided which by itself is conventional and is illustrated schematically in FIGS. 30, 31 and 32. To sense pressures in the cargo tanks 32 and to transmit the pressure variations therein to the air system aforementioned, a differential pressure cell 400 is connected into the vapor riser 244 which is in direct communication with the tanks through the vapor header 212. The differential pressure cell as mentioned above is standard equipment and consists of a diaphragm type pressure sensing means by which presure variations in the tanks 32 can be used to operate an air control system. The control system is represented by broken lines in FIGS. 30 through 32, which extend from the pressure cell 400 to valves 320 and 324 as well as to the refrigeration machines 230 for purposes which will be made clear from the description which follows.

To load the liquefied gas cargo tanks 32, the deck manifold 210 is connected to the shore supply and the liquefied gas pumped from this supply by shore pumps positioned adjacent thereto to develop adequate pumping pressures. In that the entire liquefied gas handling system may require considerable cooling before the tanks can be loaded, it may be necessary to introduce small quantities of cold liquefied gas from the shore supply through the piping and into the tanks to prevent thermal shock. To effect such gradual cooling, liquefied gas is fed from the deck manifold 210 through the recirculating header 218 and into the tanks 32 by way of the nozzles 316. Also, small amounts of cold liquid may be circulated in like fashion throughout the other portions of the system. After the system is cooled sufficiently, the liquefied gas as represented by the heavy lines in FIG. 30, is pumped through the loading line 308 and past the valve 320 therein to the tank loading and unloading mains 274 and into the tanks 32. In that a substantial amount of vapors will be displaced in each of the tanks 32 during the loading operation as the liquid level rises, the refrigeration machinery 230 will be rendered operative at this time. Accordingly, the vapors V in the cargo tanks will be fed from the top of the tanks 32 back through the vapor header 212 and downwardly through the line 244 to the refrigeration machines. The vapors are condensed in the refrigeration machines and this condense returned by way of conduit 234 to the low pressure receiver 232. The condensate is then pumped by condensate return pump 238 through lines 256, 258, 260 and 262 to the condensate return header 226 and into the tank through the distribution header 312. To control the quantity of condensate being returned to the tanks in accordance with the quantity of gas condensed by the refrigeration machines, the valve 322 is controlled in response to liquid level in the low pressure receiver 232 by an air system indicated by the broken line 402. Though an air system is preferred, it will be understood that an electrical level sensing system or other means might be used to control the valve 322. Also, to prevent excess pressures from developing in the tanks 32 during the loading operation, the pressure differential cell 400 is arranged to adjust the valve 320 in the loading line 308 in a manner such that the loading rate is decreased or increased in accordance with respective decreases or increases in cargo tank pressures. It will be unnecessary to operate the recirculating pump 236 during the loading operation for the purpose of stirring the liquefied gas being fed into the tanks 32.

When the vessel is at sea, except under conditions of cold ambient temperatures such as during the winter months or in northern latitudes, due to heat leak into the tanks 32 a certain amount of vaporization of the liquefied gases will occur. Unless these vapors are condensed, excess pressures will build up in the tank to the point where the vapors will pass through release valves 216 and out through the vent mast 20 thus constituting a loss of cargo. For this reason the refrigeration machines are operated upon increases in pressure within the tanks to condense the vapors. Under normal conditions, it will be necessary to use only one of the units 230, though the number necessary to satisfactorily convert the vapors to liquid condensate will depend on the amount of heat leak, the size of refrigeration units, the number of tanks being used and like considerations. The path taken by the vapors and condensate in passing from the tanks 32 to the refrigeration units and back to the tanks is the same as described above in conjunction with the loading operation and is depicted by the heavy lines in FIG. 31.

Also, while the vessel is at sea, the problem of thermal stratification of the liquefied gases often occurs as a result of increasing pressures at lower levels in the tanks, permitting the absorption of more heat and the existence of higher temperatures at these low levels. If the cargo becomes agitated when this condition exists or for other reasons, the warmer and less dense liquid at the lower levels of the tanks rises and upon encountering lower pressures at the upper level of the tank flashes into vapor. This, of course, would cause abnormal increases in tank pressures and therefore would require an unnecessary refrigeration load. To overcome this problem, a recirculation system is provided and put into operation whenever the temperature differential between upper and lower levels in the tanks 32 exceeds a predetermined maximum amount. The operation of the recirculating system is brought about by turning on the pump 236 which circulates through the path indicated also by the heavy lines in FIG. 31. As shown, the liquid passes from the loading main 272 through the riser 270, line 266 and upwardly through the riser 264 to the recirculation header 218. From the header 218, the liquid is passed to the tanks and outwardly from the nozzles 316 into the tank. Due to the angular disposition of the nozzles 316, a stirring action is imparted to the liquids in the tanks thereby eliminating the objectionable stratification.

When the conditions under which the liquefied gas in the tanks 32 is being stored or transported require little or no refrigeration such as in the winter time or in northern latitudes, it may be possible to reduce the pressure in the cargo tanks to a minimum permissible value and close down the refrigeration machinery. When the refrigeration machinery is turbine driven however, the difficulties in shutting down and starting up the equipment will be extensive and accordingly, it may be found extremely undesirable to merely close down the refrigeration equipment when it is not needed. On the other hand, if the refrigeration machinery is kept running under these conditions of low ambient temperature, it is possible that the compressors thereof will surge due to the lack of a refrigeration load and thereby cause damage to the machinery. To alleviate this problem, an artificial refrigeration load may be developed by passing a certain amount of the liquefied gas through the vaporizer preheater 288 and the vaporizer 276. The liquid supplied to the vaporizing unit may come from either lines 282 or 284 which are connected to the recirculation riser and condensate riser 264 and 262 respectively. The amount of liquid passing through the vaporizer is controlled by valve 324 which in turn is regulated by the pressure differential cell 400. In other words, when the vapor pressure in the riser 244 decreases to a predetermined value, the valve 324 will open to permit a sufficient quantity of liquefied gas to pass through the vaporizer and develop the necessary refrigeration load.

To unload the cargo tanks 32 when the vessel is in port, the deck manifold or header 210 is again connected to the shore system. At this time the cargo pumps 241 and 242 are operated to pump liquid from the tanks through the unloading main 274 to the deck manifold 210 as shown in FIG. 34. Since the removal of liquid from the tanks 32 will cause negative pressures to develop therein, the vaporizer is again used to generate vapors to replace the removed liquids and thereby maintain the tank pressures at or about atmospheric pressure. For this reason, the recirculating pump 236 is rendered operative to supply the vaporizer with liquefied gas from the recirculating riser 270 which is connected to the loading and unloading mains 274. It will not be necessary for the refrigeration machinery to be in operation during the unloading.

*Summary*

In view of the foregoing description, it will be seen by those familiar with the art that by this invention, a highly effective structural organization is provided for the storage and transportation of liquefied gas at low temperatures simultaneously with ordinary liquids such as oil, gasoline and the like. The provision of wing and floor tanks in the hull of the vessel along with a piping and pumping system therefor establishes a compact, fully equipped storage arrangement adaptable for transporting ordinary liquid cargoes and yet, as described, these tanks may be used also for ballast water without requiring any outside pumping apparatus. Moreover, the holds 28 defined in part, by the wing and floor tanks are efficiently used to receive the independent, thermally insulated, liquefied gas containing tanks 32 which in turn, are shaped to make maximum use of the space available as well as being adequately reinforced to resist internal and external pressures and to resist the stresses caused by thermal expansion and contraction. The new and improved tank mounting devices of this invention serve not only to secure the tanks within the holds and thermally insulate them therefrom, but also to space them properly from the walls of the holds to permit thermal expansion, working space for interior hull maintenance and to permit, if necessary, the installation of auxiliary heating means to protect the hull from the cold temperatures of the liquefied gas.

The new and unique liquefied gas handling system aforementioned not only facilitates the handling of these extremely volatile liquids during transporting at sea, but also provides means by which the in port operations of loading and unloading are greatly enhanced. For example, the recirculating means for which the liquefied gas is constantly stirred to prevent thermal stratification along with combination of the refrigeration units 230 and the vaporizer 276 permits delicate control of positive and negative pressures in the tanks 32 solely by thermal exchange and without loss of cargo. This organization also facilitates the loading operation by making it possible to condense the abnormal amounts of vapor evolved at that time and thus reduce pressures created within the tanks. Further, during unloading, vapors may be generated by the vaporizer 276 to take the place of the liquid removed from the tanks, thereby preventing the formation of vacuums and resulting stresses imposed on the tank walls.

Thus, the unique structural and cargo handling organization referred to above, as well as many other features inherent in the new and improved vessel of this invention completely fill the aforementioned objects. Since many possible changes can be made in this invention, it is to be understood that the preceding description is illustrative only and not limiting, and that the true spirit and scope thereof is to be determined by the appending claims.

We claim:

1. Apparatus for the storage and transportation at about atmospheric pressure of liquefied gas at low temperatures simultaneously with ordinary liquid cargo such as crude oil, gasoline or the like comprising: a ship having a fluid impervious exterior shell; interior fluid impervious walls spaced from the side and bottom portions of said shell to establish wing and floor tanks respectively for containing the ordinary liquid; a plurality of transverse bulkheads defining with said wing and floor tanks, a plurality of fluid impervious holds; an independent tank in each of said holds for containing the liquefied gas, each of said independent tanks including a layer of thermal insulation; a plurality of thermally insulative blocks; dependent brackets on said independent tanks for engaging said blocks from above; and upstanding brackets in said holds for engaging said blocks from below, said brackets engaging said blocks along parallel inclined planes and positioned symmetrically to oppose horizontal movement of said tanks within said holds, said blocks constituting the sole connection between said brackets, the spacing between said tanks and said holds being sufficient to permit free access to the exterior of said tanks; means for handling the liquefied gas during loading, transporting and unloading operations to maintain the pressure in said liquefied gas containing tanks at about atmospheric pressure without venting said tanks to the atmosphere said means for handling the liquefied gas including a refrigeration unit operable to withdraw, condense and return to the tank as liquid, vapors existing within said tanks upon the occurrence of increased pressure therein and a vaporizer operable to vaporize some of the liquefied gas upon the occurrence of negative tank pressures and return it to the tank as vapor; and means for loading and unloading said wing and floor tanks.

2. A tank for containing at about atmospheric pressure liquefied gas at low temperatures comprising bottom, top, side and end walls of generally rectangular configuration; each of said walls including a substantially smooth exterior, fluid impervious plating; a plurality of parallel, generally vertical stiffeners on the interior of said plating; and a plurality of girders extending generally perpendicularly to said stiffeners, said girders being cut out at their inner edge to receive said stiffeners, the spacing of said girders on said side and end walls being greater at the upper portion of said walls than at the lower portion thereof.

3. Means for supporting a tank containing low temperature liquefied gas at about atmospheric pressure in an enclosure comprising: a plurality of thermally insulative blocks; brackets depending from the tank engaging said blocks from above; upstanding brackets on the floor of the enclosure engaging said blocks from below; the block engaging portion of said brackets lying in generally parallel planes inclined downwardly and inwardly and positioned uniformly about the center of the tank, said blocks constituting the sole connection between said brackets.

4. The apparatus recited in claim 3 in which said thermally insulative blocks and block engaging means are located on circles concentric with the tank center and symmetrically spaced on said circles.

5. In an apparatus for storing and transporting at about atmospheric pressure liquefied gas at low temperature, liquid recirculation means for stirring the liqeufied gas to prevent thermal stratification thereof; said means including nozzles immersed in the liquid gas and directed in diverse directions and means for circulating the liquid gas through said nozzles; refrigeration means for condensing vapors evolved from the liquefied gas upon the occurrence of increased storage pressures; and means for vaporizing the liquefied gas upon the occurrence of negative storage pressures, said refrigeration and vaporizing means being separate and distinct from said liquid recirculation means.

6. The combination recited in claim 5 in which said vaporizing means comprises: a steam chamber; a heat exchanger in said steam chamber; and a pre-heater, said pre-heater including a chamber for receiving relatively cold liquefied gas and a heat exchanger through which relatively warm vapors from said steam chamber are passed.

7. The apparatus recited in claim 1 including diversely directed nozzles in said independent tanks, said nozzles being positioned toward the bottom of said independent tanks to be submerged in the liquefied gas; and means for pumping the liquefied gas through said nozzles.

8. Apparatus for the storage and transportation at about atmospheric pressure of liquefied gas at low temperatures comprising: a ship having a plurality of generally rectangular, fluid impervious holds; a generally rectangular, thermally insulated tank in each of said holds for containing the liquefied gas, the walls of said tanks being spaced from the wall of said holds; means for maintaining at about atmospheric pressure the pressure in said tanks, said means including a refrigeration system operative upon high tank pressure to condense vapors within said tanks and a vaporizer operative upon low tank pressures to vaporize the liquefied gas; diversely directed nozzles in said tanks, said nozzles being positioned toward the bottoms of said tanks to be submerged in the liquefied gas; and pump means connected in a closed circuit for withdrawing the liquefied gas from the container and recirculating the liquefied gas through said nozzles.

References Cited by the Examiner

UNITED STATES PATENTS

| | | | |
|---|---|---|---|
| 1,140,250 | 5/15 | Cabot | 114—74 |
| 1,371,427 | 3/21 | Kerr | 62—54 |
| 2,406,540 | 8/46 | Harrington | 62—54 |
| 2,480,472 | 8/49 | Jackson | 114—74 |
| 2,502,184 | 3/50 | Thayer | 62—51 |
| 2,520,883 | 8/50 | Kornemann et al. | 114—74 |
| 2,550,886 | 5/51 | Thompson | 62—55 |
| 2,563,118 | 8/51 | Jackson | 114—74 |
| 2,712,730 | 7/55 | Spangler | 62—48 X |
| 2,790,307 | 4/57 | Ayres | 62—55 |
| 2,858,136 | 10/58 | Rind | 114—74 |
| 2,896,416 | 7/59 | Henry | 62—54 X |
| 2,929,221 | 3/60 | Clauson | 114—74 |
| 2,933,902 | 4/60 | Howard | 114—74 |
| 2,939,294 | 6/60 | Gomory | 62—54 |
| 2,943,454 | 7/60 | Lewis | 62—52 |
| 2,970,559 | 2/61 | Leroux | 114—74 |
| 2,986,011 | 5/61 | Murphy | 62—55 |
| 2,992,622 | 7/61 | Maker | 114—74 |
| 3,011,321 | 12/61 | Clauson | 62—54 |
| 3,018,916 | 1/62 | Henry | 114—74 |
| 3,031,856 | 5/62 | Wiedman et al. | 114—74 |
| 3,064,612 | 11/62 | Gardner et al. | 114—74 |

FOREIGN PATENTS

| | | |
|---|---|---|
| 220,768 | 3/59 | Australia. |
| 685,425 | 11/39 | Germany. |
| 952,178 | 11/56 | Germany. |
| 91,767 | 5/58 | Norway. |

ROBERT A. O'LEARY, *Primary Examiner.*

UNITED STATES PATENT OFFICE
CERTIFICATE OF CORRECTION

Patent No. 3,213,632                October 26, 1965

Allen Schuler Valk et al.

It is hereby certified that error appears in the above numbered patent requiring correction and that the said Letters Patent should read as corrected below.

Column 6, line 45, for "28" read -- 38 --; line 47, for "of" read -- or --; column 7, lines 53 and 54, for "98b, 98c, 98d" read -- 96b, 96c, 96d --; column 10, line 23, for "on-short" read -- on-shore --; column 11, line 15, for "tank" read -- tanks --; column 14, line 39, for "Thes" read -- These --.

Signed and sealed this 26th day of July 1966.

(SEAL)
Attest:

ERNEST W. SWIDER               EDWARD J. BRENNER
Attesting Officer               Commissioner of Patents